(12) United States Patent
Hanyu et al.

(10) Patent No.: US 10,731,025 B2
(45) Date of Patent: Aug. 4, 2020

(54) POWDER, THERMOPLASTIC COMPOSITION, AND METHOD FOR PRODUCING THREE-DIMENSIONAL OBJECT

(71) Applicant: CANON KABUSHIKI KAISHA, Tokyo (JP)

(72) Inventors: Yukio Hanyu, Isehara (JP); Tomohiro Saito, Utsunomiya (JP); Akira Sugiyama, Yokohama (JP); Naotake Sato, Sagamihara (JP); Masahiko Takahashi, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 15/604,505

(22) Filed: May 24, 2017

(65) Prior Publication Data

US 2017/0260359 A1    Sep. 14, 2017

Related U.S. Application Data

(63) Continuation of application No. PCT/JP2015/083365, filed on Nov. 27, 2015.

(30) Foreign Application Priority Data

| Nov. 28, 2014 | (JP) | ................................ | 2014-242508 |
| Jun. 5, 2015 | (JP) | ................................ | 2015-115238 |
| Nov. 26, 2015 | (JP) | ................................ | 2015-231169 |

(51) Int. Cl.
*B32B 5/16* (2006.01)
*C08K 5/103* (2006.01)
(Continued)

(52) U.S. Cl.
CPC ............... *C08K 5/103* (2013.01); *B32B 1/00* (2013.01); *B32B 5/16* (2013.01); *B32B 5/30* (2013.01);
(Continued)

(58) Field of Classification Search
None
See application file for complete search history.

(56) References Cited

U.S. PATENT DOCUMENTS

2005/0003189 A1* 1/2005 Bredt .................... C08L 101/00
                                                              428/402
2017/0283596 A1* 10/2017 Saito ....................... C08L 1/286

FOREIGN PATENT DOCUMENTS

| JP | H11-012161 A1 | 1/1999 |
| JP | 2001-079641 A | 3/2001 |

(Continued)

OTHER PUBLICATIONS

Machine translation of JP 2008-208231 (Year: 2008).*
(Continued)

*Primary Examiner* — Hoa (Holly) Le
(74) *Attorney, Agent, or Firm* — Canon U.S.A., Inc. IP Division

(57) ABSTRACT

A powder contains particles containing a water-soluble material and a water-insoluble material. When dependence on temperature of a storage elastic modulus and a loss elastic modulus of a cylindrical compact of the powder in a shear direction, the cylindrical compact having a diameter of 10 mm and a thickness of 1 mm, is measured with a rotational rheometer at an angular frequency of 1 Hz and a rate of temperature increase of 2° C./min, letting a temperature at which the storage elastic modulus is 1 MPa be T° C., the storage elastic modulus is always higher than the loss elastic modulus in a temperature range of T° C. to (T+10)° C.

4 Claims, 17 Drawing Sheets

(51) Int. Cl.
| | |
|---|---|
| *B32B 1/00* | (2006.01) |
| *B32B 5/30* | (2006.01) |
| *G03G 15/22* | (2006.01) |
| *B33Y 10/00* | (2015.01) |
| *B33Y 70/00* | (2020.01) |
| *C08L 1/02* | (2006.01) |
| *B29C 64/147* | (2017.01) |
| *B82Y 30/00* | (2011.01) |

(52) U.S. Cl.
CPC ............... *B33Y 10/00* (2014.12); *B33Y 70/00* (2014.12); *C08L 1/02* (2013.01); *G03G 15/224* (2013.01); *B29C 64/147* (2017.08); *B32B 2250/44* (2013.01); *B32B 2262/0269* (2013.01); *B32B 2262/062* (2013.01); *B32B 2264/062* (2013.01); *B32B 2274/00* (2013.01); *B32B 2307/50* (2013.01); *B32B 2307/73* (2013.01); *B82Y 30/00* (2013.01)

(56) References Cited

FOREIGN PATENT DOCUMENTS

| | | | |
|---|---|---|---|
| JP | 2002-516346 A | | 6/2002 |
| JP | 2003-53849 A1 | | 2/2003 |
| JP | 2003-505845 A | | 2/2003 |
| JP | 2004-532753 A | | 10/2004 |
| JP | 2010 189516 A | | 9/2010 |
| JP | 2010242063 A | * | 10/2010 |
| JP | 2011208293 A | * | 10/2011 |
| JP | 2012-126788 A | | 7/2012 |

OTHER PUBLICATIONS

A. Kaushik et al., Green nanocomposites based on thermoplastic starch and steam exploded cellulose nanofibrils from wheat straw, Carbohydrate Polymers 82 (2010) 337-345 (Year: 2010).*

Priya et al., Synthesis, characterization and antibacterial activity of biodegradable starch/PVA composite films reinforced with cellulosic fibre, Carbohydrate Polymers 109 (2014) 171-179 (Year: 2014).*

Chaleat et al., Study on the phase separation of plasticised starch/poly(vinyl alcohol) blends, Carbohydrate Polymers 97 (2012) 1930-1939 (Year: 2012).*

Translation JP 61-89559 B1 (Title: "Powdered cellulose nanofiber for composition production, method for producing powdered cellulose nanofiber for composition production, and composition") (Year: 2017).*

* cited by examiner 50.0 μm

POWDER, THERMOPLASTIC COMPOSITION, AND METHOD FOR PRODUCING THREE-DIMENSIONAL OBJECT

CROSS-REFERENCE TO RELATED APPLICATIONS

This application is a Continuation of International Patent Application No. PCT/JP2015/083365, filed Nov. 27, 2015, which claims the benefit of Japanese Patent Application No. 2014-242508, filed Nov. 28, 2014, Japanese Patent Application No. 2015-115238, filed Jun. 5, 2015, and Japanese Patent Application No. 2015-231169, filed Nov. 26, 2015, which are hereby incorporated by reference herein in their entirety.

TECHNICAL FIELD

The present invention relates to a powder, a thermoplastic composition, and a method for producing a three-dimensional object.

BACKGROUND ART

Additive manufacturing processes for manufacturing three-dimensional objects by depositing constituent materials in a layer-by-layer manner according to the cross-sectional data of target three-dimensional objects have recently been receiving attention as methods for producing three-dimensional objects.

Japanese Patent Laid-Open No. 2003-53849 discloses a build-up method in which a powder composed of a thermoplastic material is arranged by an electrophotographic method according to the cross-sectional data of a three-dimensional object, and then the thermoplastic material in the form of particles are fused together in a layer-by-layer manner.

When a complicated three-dimensional object including, for example, an overhang structure or a structure including a moving part is manufactured by the additive manufacturing process, a structural material needs to be arranged on a region where the structural material is not present. In such a case, at least two thermoplastic materials, i.e., the structural material that constitutes a target three-dimensional object and a support material that supports the lamination of the structural material, need to be used as constituent materials.

A support portion composed of the support material is arranged in a region where the target three-dimensional object is not present in the additive manufacturing process. The support portion supports the structural material arranged on the region where the structural material is not present, and the support portion is eventually removed. Thus, the support material is desirably composed of a material that can be easily removed from a surface of the object composed of the structural material.

PCT Japanese Translation Patent Publication No. 2002-516346 discloses a technique using poly(2-ethyl-2-oxazoline), which is an aqueous organic material, as a support material. The use of the aqueous organic material as a support material can remove a support portion by washing with water.

CITATION LIST

Patent Literature

PTL 1 Japanese Patent Laid-Open No. 2003-53849
PTL 2 PCT Japanese Translation Patent Publication No. 2002-516346

SUMMARY OF INVENTION

To improve the strength and other properties of a three-dimensional object in an additive manufacturing process, the particles of a constituent material are preferably heated to a temperature equal to or higher than the softening temperature of the constituent material to fuse the particles of the constituent material together.

However, many water-soluble organic materials are rapidly softened when heated to temperatures higher than their softening temperatures. A constituent material containing such a water-soluble organic material is rapidly softened when heated to a temperature higher than its softening temperature. This results in the deformation of a formed portion composed of the constituent material containing the water-soluble organic material, failing to form a layer. In the case where a constituent material containing a water-soluble organic material is heated and fused in an additive manufacturing process, there is a problem that precise temperature control is required.

In light of the foregoing problems, it is an object of the present invention to provide a constituent material that can be removed by bringing the constituent material into contact with a water-containing liquid after the lamination of layers and that can facilitate temperature control in an additive manufacturing process.

One aspect of the present invention is directed to providing a powder including a thermoplastic particle containing a water-soluble organic material and a water-insoluble organic material, in which when dependence on temperature of a storage elastic modulus and a loss elastic modulus of a cylindrical compact of the powder in a shear direction, the cylindrical compact having a diameter of 10 mm and a thickness of 1 mm, is measured with a rotational rheometer at an angular frequency of 1 Hz and a rate of temperature increase of 2° C./min, letting a temperature at which the storage elastic modulus is 1 MPa be T° C., the storage elastic modulus is always higher than the loss elastic modulus in a temperature range of T° C. to (T+10)° C.

Further features of the present invention will become apparent from the following description of exemplary embodiments with reference to the attached drawings.

DESCRIPTION OF EMBODIMENTS

Figure 1A:
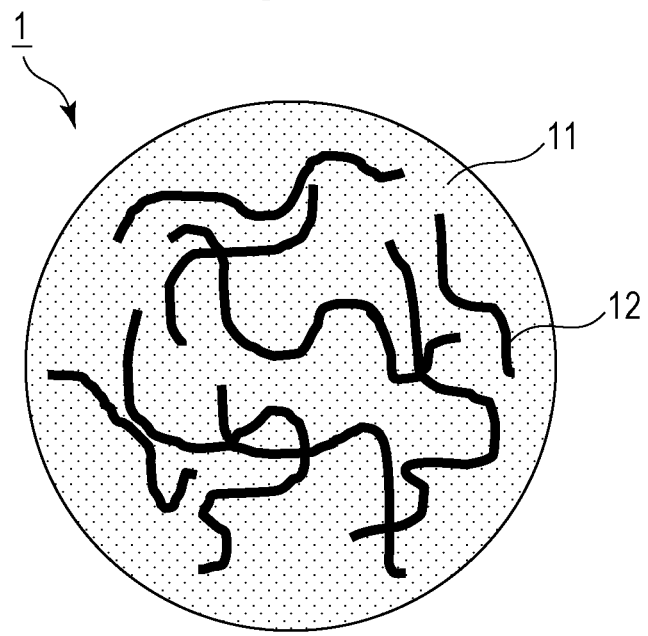
FIG. 1A schematically illustrates a cross-sectional structure of a thermoplastic particle contained in a powder according to an embodiment.

While embodiments of the present invention will be described in detail below with reference to the attached drawings, the present invention is not limited to the embodiments described below. Various modifications and improvements of the following embodiments can be made on the basis of the usual knowledge of those skilled in the art without departing from the scope of the present invention.

As used herein, the term "constituent material powder" refers to a constituent material in the form of powder for use in the production of a three-dimensional object. The constituent material is classified into a structural material that constitutes a target three-dimensional object and a support material that supports the lamination of layers composed of the structure material. A support portion composed of the support material is a portion that supports the structural material disposed on a region where the structural material is not present and that will be eventually removed. The constituent material powder is classified into a structural material powder that is composed of a powdery structural material and a support material powder that is composed of a powdery support material. As used herein, the term "powder" refers to a collection of particles.

Generally, water-insoluble materials are often used as structural materials that constitute three-dimensional objects. In this embodiment, a structural material powder and a support material powder disposed according to cross-sectional data are heated and fused together to form a three-dimensional object, as described below. Thus, a powder of a thermoplastic material, such as a thermoplastic resin, a thermoplastic metal material, or a thermoplastic inorganic material, may be preferably used as a structural material powder according to this embodiment. In particular, the structural material powder preferably contains thermoplastic resin particles in view of a temperature required for fusion. The term "thermoplastic" refers to the property in which although a material is not easily deformed at normal temperature, the material exhibits plasticity and can be freely deformed when heated to a temperature corresponding to the material, and the material is hardened again when cooled.

Non-limiting examples of the thermoplastic resin include acrylonitrile-butadiene-styrene (ABS), polypropylene (PP), polyethylene (PE), polystyrene (PS), polymethyl methacrylate (PMMA), poly(ethylene terephthalate) (PET), poly(phenylene ether) (PPE), polyamide (PA) such as nylon, polycarbonate (PC), polyoxymethylene (POM), also known as polyacetal, poly(butylene terephthalate) (PBT), poly(phenylene sulfide) (PPS), poly(ether ether ketone) (PEEK), liquid crystal polymers (LCPs), fluororesins, urethane resins, and elastomers.

The structural material powder may further contain a functional material, such as a pigment or dispersant, to achieve a function of a target three-dimensional object.

In the case where a water-insoluble material is used as a structural material, if a material that can be removed with water is used as a support material that constitutes a support portion, the support portion can be removed from an item after lamination. Removal of the support portion with water results in a low cost of removing the support portion because of the easy availability of water. The use of water for removal of the support portion is significantly preferred because of a high level of safety and a low environmental load of water. Preferably, the support material is also a thermoplastic material.

The term "water-insoluble material" used here refers to a material that has a water solubility less than 0.1. The term "water-soluble material" refers to a material that has a water solubility of 0.1 or more. The term "water solubility" refers to the value of the mass of a substance dissolved in 100 g of deionized water with a temperature of 20° C. at 1 atm, the value being expressed in units of g.

Powder 100

A powder 100 according to an embodiment contains thermoplastic particles 1 (hereinafter, referred to as "particles 1"). Each of the particles 1 contains a water-soluble organic material 11 (hereinafter, referred to as a "water-soluble material 11") that has a high water solubility and a water-insoluble organic material 12 (hereinafter, referred to as a "water-insoluble material 12"). Each of the particles 1 is composed of a thermoplastic composition containing the water-soluble material 11 and the water-insoluble material 12.

Letting a temperature at which the storage elastic modulus (G') of the powder 100 is 1 MPa be T (° C.), the storage elastic modulus (G') of the powder 100 is always higher than the loss elastic modulus (G″) of the powder 100 in the temperature range of T° C. to (T+10)° C. The storage elastic modulus and the loss elastic modulus are values obtained by measuring temperature dependence of a storage elastic modulus and a loss elastic modulus of a cylindrical compact of the powder 100 in a shear direction, the cylindrical compact having a diameter of 10 mm and a thickness of 1 mm, with a rotational rheometer at an angular frequency of 1 Hz and a rate of temperature increase of 2° C./min.

Components in each of the particles 1 and the viscoelasticity of the powder 100 will be described below.

Water-Soluble Material 11

Each of the particles 1 contains the water-soluble material 11. Because each of the particles 1 contains the water-soluble material 11, the water-soluble material 11 in each of the particles 1 is easily dissolved in water, thus easily removing a support portion with water.

As the water-soluble material 11, specifically, a water-soluble sugar such as a water-soluble monosaccharide, disaccharide, trisaccharide, tetrasaccharide, oligosaccharide, polysaccharide, or dietary fiber, poly(alkylene oxide), or poly(vinyl alcohol) (PVA), is preferably used.

Specific examples of the water-soluble sugar include, but are not limited to, monosaccharides such as glucose, xylose, and fructose; disaccharides such as sucrose, lactose, maltose, trehalose, and isomaltulose (Palatinose (registered trademark)); trisaccharides such as melezitose, maltotriose, nigerotriose, maltotriose, raffinose, and kestose; tetrasaccharides such as stachyose, maltotetraose, nystose, and nigerotetraose; oligosaccharides such as isomaltooligosaccharide, fructooligosaccharide, xylooligosaccharide, soybean oligosaccharides, galactooligosaccharide, nigerooligosaccharides, and lactosucrose; dietary fibers such as polydextrose and inulin; and sugar alcohols such as xylitol, sorbitol, mannitol, maltitol, lactitol, oligosaccharide alcohols, and erythritol.

Specific examples of poly(alkylene oxide), but are not limited to, poly(ethylene glycol) (PEG) and poly(ethylene oxide) (PEO).

To facilitate removal of a portion formed of the powder 100 (support portion) with water, the proportion by mass of the water-soluble material 11 in the whole of each of the particles 1 is preferably 50% or more, more preferably 70% or more. The upper limit of the proportion by mass of the water-soluble material 11 in the whole of each of the particles 1 is not particularly limited and may be 95% or less or may be 90% or less. The water-soluble material 11 content is, by mass, preferably 50% or more and 95% or less, more preferably 70% or more and 90% or less per 100% of the total mass of each of the particles 1. The water-soluble material 11 content is, by mass, preferably 50% or more and 95% or less, more preferably 70% or more and 90% or less per 100% of the total mass of the powder 100.

The water-soluble material 11 may be composed of a single type of water-soluble organic material or may contain different types of water-soluble organic materials. When different types of water-soluble organic materials are contained, the total mass of these water-soluble organic materials may be used to calculate the proportion by mass of the water-soluble material 11 in the whole of each of the particles 1. The type of water-soluble material used here is defined by a chemical structure. Different chemical structures are expressed as different types.

In the case where the water-soluble material 11 contains different types of water-soluble organic materials, the sentence "the water solubility of a material is lower than the water solubility of the water-soluble organic material" refers to the fact that the water solubility of the material is lower than any of the water solubilities of the water-soluble organic materials contained in the water-soluble material 11. The sentence "the storage elastic modulus of a material is higher than the storage elastic modulus of the water-soluble organic material" refers to the fact that the storage elastic modulus of the material is higher than any of the storage elastic moduli of the water-soluble organic materials contained in the water-soluble material 11.

Although any water-soluble organic material may be used as the water-soluble organic material in the water-soluble material 11, such a water-soluble organic material preferably has a water solubility more than 1, more preferably more than 10, even more preferably 50 or more.

In the case where a mixture of two or more types of materials is used as the water-soluble material 11, various properties, such as the viscosity and the softening temperature, of each of the particles 1 and the powder 100 can be adjusted to desired values by adjusting the proportions of the materials in the mixture. For example, the softening temperature of each of the particles 1 and the powder 100 can be adjusted by using a mixture of maltotetraose and lactitol, which has a lower softening temperature than maltotetraose, as water-soluble organic materials and adjusting the proportions of maltotetraose and lactitol.

Because various properties, such as the viscoelastic properties and the softening temperature, of each of the particles 1 and the powder 100 can be adjusted to desired values, the water-soluble material 11 preferably contains a first water-soluble organic material and a second water-soluble organic material.

In this embodiment, the use of an amorphous sugar as the first water-soluble organic material can reduce the hysteresis between the viscoelastic properties during heating and the viscoelastic properties during cooling. The use of a sugar alcohol as the second water-soluble organic material can adjust the softening temperature of the powder 100. The second water-soluble organic material preferably has a melting point of 60° C. or higher and 180° C. or lower. In this case, the flexibility of design of the temperature range in an additive manufacturing process is improved. Specifically, maltotetraose can be used as the first water-soluble organic material, and a sugar alcohol such as mannitol, lactitol, or erythritol, can be used as the second water-soluble organic material.

Water-Insoluble Material 12

Each of the particles 1 contains the water-insoluble material 12 in addition to the water-soluble material 11. The water-insoluble material 12 controls the viscoelasticity, such as the storage elastic modulus and the loss elastic modulus, of the particles 1 and the powder 100. The water-insoluble material 12 functions as a viscoelasticity control agent that controls the viscoelasticity of the particles 1 and the powder 100.

Generally, the water-soluble material 11 such as a water-soluble sugar has a lower softening temperature than the water-insoluble structural material, and the storage elastic modulus of the water-soluble material 11 is lower than the loss elastic modulus thereof at a temperature higher than the softening temperature. The term "softening temperature" refers to a temperature at which the storage elastic modulus starts to decrease markedly with increasing temperature when a substance is heated. In this specification, as described in examples, a temperature at which the storage elastic modulus as a function of temperature in the shear direction is 1 MPa is defined as a softening temperature, the storage elastic modulus being measured with an MCR 302 rheometer (available from Anton Paar).

The term "storage elastic modulus (G')" used here refers to the degree of elasticity of a substance. The term "elasticity" refers to the property whereby after a certain external force is applied to a material to deform the material, the shape of the deformed material is returned to its original shape when the external force is removed. The term "loss elastic modulus (G")" refers to the degree of viscosity of a substance. The term "viscosity" generally indicates the property of a liquid and refers to the property whereby after a certain external force is applied to a material to deform the material, the shape of the deformed material is not returned to its original shape when the external force is removed.

When the storage elastic modulus of a material is higher than the loss elastic modulus of the material in a certain temperature range, the material exhibits elastic behavior in the temperature range. That is, even if the material is deformed by application of an external force thereto, the material is returned to its original shape and exhibits rubber-like behavior. Conversely, when the storage elastic modulus of a material is lower than the loss elastic modulus of the material in a certain temperature range, the material exhibits viscous behavior in the temperature range. That is, when an external force is applied to the material to deform the material, the material flows and is not returned to its original shape and exhibits sol-like behavior.

When the powder 100 is used as a support material powder, the powder 100 is disposed in a layer-by-layer manner in combination with the structural material powder. Both of the support material powder and the structural material powder are fused by heating in a heat-fusion step to form a layer. The details will be described below. In the heat-fusion step, both of the support material powder and the structural material powder need to be heated to a temperature equal to or higher than a temperature at which both of the support material powder and the structural material powder are softened. Because the water-soluble material 11 is heated to a temperature markedly higher than the softening temperature of the water-soluble material 11 in the heat-fusion step, the water-soluble material 11 exhibits sol-like behavior and flows easily. As a result, a support material powder containing the water-soluble material 11 in the related art cannot maintain the shape to cause a marked deformation of a support portion formed of the support material powder in the layer.

A large deformation results in an uneven height of the layer formed by the fusion of a particle layer to cause irregularities on an upper or lower surface of the layer. The formation of the irregularities on the upper or lower surface of the layer causes voids when a layer is laminated on a formed item or when a next layer is laminated on the layer. This results in a partially defective object to fail to obtain a three-dimensional object having a desired shape. Accordingly, a difficulty lies in disposing the support material powder containing the water-soluble material 11 in a layer-by-layer manner in combination with a water-insoluble structural material powder.

In contrast, each of the particles 1 contained in the powder 100 according to this embodiment contains the water-insoluble material 12 functioning as a viscoelasticity control agent in addition to the water-soluble material 11. Thus, letting a temperature at which the structural material of the powder 100 is 1 MPa be T° C., the storage elastic modulus of the powder 100 is always higher than the loss elastic modulus of the powder 100 in the temperature range of T° C. to (T+10)° C. Thus, the powder 100 always exhibits rubber-like behavior even in the temperature range in the heat-fusion step and does not flow, maintaining the shape. The water-insoluble material 12 can be removed with a water-containing liquid by dissolving or dispersing the water-insoluble material 12 in the water-containing liquid. Thus, the powder 100 can be disposed in a layer-by-layer manner in combination with the water-insoluble structural material powder despite the fact that the powder 100 can be removed by bringing the powder 100 into contact with the water-containing liquid after lamination.

Generally, the water-soluble material 11 such as a water-soluble sugar is liable to be tacky when heated. When a thermoplastic material composed of the water-soluble material 11 is laminated by heating, for example, the thermoplastic material can be tacky to string, possibly deforming a formed item. In contrast, in the powder 100 according to an embodiment, the storage elastic modulus of the powder 100 is always higher than the loss elastic modulus of the powder 100 in the temperature range; hence, the powder 100 is not tacky, and the deformation of a formed item can be inhibited.

The water-insoluble material 12 is present in each of the particles 1 in a dispersed state as illustrated in FIG. 1A. This can inhibit the flow of the water-soluble material 11 in each of the particles 1. As a result, even if the viscosity of the water-soluble material 11 is increased by heating, the flow of the water-soluble material 11 can be inhibited to inhibit an increase in the viscosity of the whole of each of the particles 1. The water-insoluble material 12 seems to act as a viscoelasticity control agent by this mechanism.

The water-insoluble material 12 preferably has a higher storage elastic modulus than the storage elastic modulus of the water-soluble material 11 in the foregoing temperature range. The incorporation of the water-insoluble material 12, which has a higher storage elastic modulus than the water-soluble material 11, into each of the particles 1 can improve the storage elastic modulus of the whole of each of the particles 1. The storage elastic modulus of the water-insoluble material 12 is preferably higher than the loss elastic modulus of the water-insoluble material 12 in the foregoing temperature range.

The softening temperature of the water-insoluble material 12 is preferably higher than the softening temperature of the water-soluble material 11. In the case where the softening temperature of the water-insoluble material 12 is higher than the softening temperature of the water-soluble material 11, the softening temperature of the whole of each of the particles 1 and, eventually, the entire powder 100 can be adjusted. The softening temperature of the water-insoluble material 12 is preferably higher than (T+10)° C., more preferably (T+20)° C. of the powder 100, particularly preferably the decomposition temperature of the powder 100. In this case, a decrease in the storage elastic modulus of the particles 1 and the powder 100 can be inhibited by the use of the water-insoluble material 12 during the heat-fusion step described below.

The water-insoluble material 12 is more preferably a fibrous water-insoluble organic material. In the case where the water-insoluble material 12 is a fibrous water-insoluble organic material, a three-dimensional network structure of the water-insoluble material 12 can be formed in each of the particles 1. The formation of the network structure of the water-insoluble material 12 can enhance the effect of the water-insoluble material 12 on the control of the viscoelasticity. The fibrous organic material is more flexible than fibrous inorganic materials and thus is preferred because the network structure can be more uniformly formed.

Preferably, the water-insoluble material 12 is substantially uniformly distributed in each of the particles 1. A nonuniform distribution of the water-insoluble material 12 in each of the particles 1 causes a nonuniform viscoelasticity in each of the particles 1, thereby possibly forming irregularities on an upper or lower surface of a layer after heat fusion. To improve the flatness of the upper and lower surfaces of the layer after the heat fusion, preferably, the distribution of the water-insoluble material 12 in each of the particles 1 is substantially uniform. For the same reason, high particle-to-particle uniformity in the distribution of the water-insoluble material 12 in the particles 1 is preferably achieved.

The water-insoluble material 12 preferably has a sufficiently smaller size than the particle size of each of the particles 1. Thus, the water-insoluble material 12 is preferably a fine particle material having an average particle size on a submicron or nanometer scale or a fibrous material having an average fiber diameter on a submicron or nanometer scale. Hereinafter, the fine particle material is also referred to as "nanoparticles", and the fibrous material is also referred to as "nanofibers". In this case, the water-insoluble material 12 can have improved dispersibility in each of the particles 1. Furthermore, the water-insoluble material 12 can have dispersibility in water.

The fine particle material used as the water-insoluble material 12 in this embodiment preferably has an average particle size of 0.1 µm or more and 50 µm or less. The nanofibers used as the water-insoluble material 12 in this embodiment preferably have an average fiber diameter of 1 nm or more and 500 nm or less, more preferably 1 nm or more and 100 nm or less, particularly preferably 1 nm or more and 50 nm or less. The nanofibers preferably have a length 4 or more times, more preferably 10 or more times, even more preferably 50 or more times the average fiber diameter. The use of the nanofibers having a sufficiently larger length than the average fiber diameter can form a uniform network structure in each of the particle 1.

Because the particles 1 preferably have a diameter of 100 µm or less as described below, the nanofibers preferably have a length corresponding to the diameter. Specifically, the nanofibers preferably have a length of 100 µm or less, more preferably 50 µm or less, particularly preferably 30 µm or less. The lower limit of the length of each of the nanofibers is preferably, but not necessarily, 1 µm or more, more preferably 5 µm or more.

To effectively control the viscoelasticity of the whole of each of the particles 1 and the entire powder 100 by the use of the water-insoluble material 12, preferably, the water-insoluble material 12 does not react with the water-soluble material 11, is not compatible with the water-soluble material 11, and is not degraded itself in the foregoing temperature range. Examples of such a material include cellulose and aramids.

Accordingly, cellulose nanofibers and aramid nanofibers are particularly preferred as the water-insoluble material 12. When the water-insoluble material 12 is a fine particle material, the water-insoluble material 12 is preferably microcrystalline cellulose.

The proportion by mass of the water-insoluble material 12 with respect to each of the particles 1 can be freely adjusted, depending on the type of the water-soluble material 11 and the proportion by mass of the water-soluble material 11 with respect to each of the particles 1. The proportion by mass of the water-insoluble material 12 is preferably adjusted in such a manner that the storage elastic modulus of the particles 1 is always higher than the storage elastic modulus of the particles 1 in the foregoing temperature range.

However, as described above, the support portion formed by laminating the layers of the particles 1 is removed by bringing an intermediate formed item into contact with a water-containing liquid in a removal step of removing the support portion described below. Because the removal of the support portion proceeds by dissolving the water-soluble material 11 in the liquid, the use of an excessive proportion of the water-insoluble material 12 with respect to the whole of each of the particles 1 hinders the removal of the support portion with the water-containing liquid. Thus, the proportion by mass of the water-insoluble material 12 with respect to the whole of each of the particles 1 is preferably less than 50%, more preferably 40% or less, even more preferably 30% or less. The proportion by mass of the water-insoluble material 12 with respect to the entire powder 100 is preferably less than 50%, more preferably 40% or less, even more preferably 30% or less.

The use of an insufficient proportion of the water-insoluble material 12 is less effective in hindering the flow of the water-soluble material 11 in each of the particles 1. Thus, the storage elastic modulus and the loss elastic modulus of the particles 1 are not easily controlled by the use of the water-insoluble material 12. Accordingly, the proportion by mass of the water-insoluble material 12 with respect to the whole of each of the particles 1 is preferably, but not necessarily, 15% or more. The proportion by mass of the water-insoluble material 12 with respect to the entire powder 100 is preferably, but not necessarily, 15% or more.

The content of the water-insoluble material 12 is, by mass, preferably 15% or more and less than 50% per 100% of the total mass of each of the particles 1. The content of the water-insoluble material 12 is, by mass, preferably 15% or more and less than 50% per 100% of the total mass of the powder 100. When the water-insoluble material 12 in the form of nanoparticles is used, the content of the water-insoluble material 12 is, by mass, preferably 30% or more and less than 50% per 100% of the total mass of each of the particles 1. When the water-insoluble material 12 in the form of nanoparticles is used, the content of the water-insoluble material 12 is, by mass, preferably 30% or more and less than 50% per 100% of the total mass of the powder 100.

For example, in the case where maltotetraose and lactitol are used as the water-soluble material 11 and where cellulose nanofibers are used as the water-insoluble material 12, the proportion by mass of the cellulose nanofibers serving as the water-insoluble material 12 is preferably 15% or more and less than 50%, more preferably 15% or more and 30% or less.

Viscoelasticity of Powder 100

As described above, the powder 100 is characterized in that letting a temperature at which the storage elastic modulus of the powder 100 is 1 MPa be T° C., the storage elastic modulus of the powder 100 is always higher than the loss elastic modulus of the powder 100 in the temperature range of T° C. to (T+10)° C. This facilitates the temperature control in the additive manufacturing process to improve the flexibility of design of the temperature range. The properties relating viscoelasticity required for the powder 100 will be further described below.

In the powder 100, more preferably, the storage elastic modulus of the powder 100 is always higher than the loss elastic modulus of the powder 100 in the temperature range of T° C. to (T+20)° C. In the powder 100, particularly preferably, the storage elastic modulus of the powder 100 is always higher than the loss elastic modulus of the powder 100 in the temperature range of T° C. to a temperature lower than the decomposition temperature of the powder 100. This further facilitates the temperature control in the additive manufacturing process to further improve the flexibility of design of the temperature range. In the case where the powder 100 is disposed in a layer-by-layer manner in combination with a different type of constituent material powder, the range of choices of the constituent material powder can be expanded.

In the case where the powder 100 according to an embodiment is disposed in a layer-by-layer manner in combination with a different type of constituent material powder such as a structural material powder, the storage elastic modulus of the powder 100 is preferably equal to or higher than the storage elastic modulus of the structural material powder in the temperature range in the heat-fusion step. The case where a water-insoluble structural material powder is used as the different type of constituent material powder will be described below. Any type of constituent material powder different from the powder 100 may be used. For example, the same is true in the case of using a water-soluble-material-containing structural material powder as a different type of constituent material powder.

When the storage elastic modulus of the powder 100 is lower than the storage elastic modulus of a structural material powder used in combination, the powder 100 alone can be heavily deformed in the heat-fusion step or a lamination step.

For example, the powder 100 preferably has a storage elastic modulus of 0.1 MPa or more in the temperature range in the heat-fusion step. This can prevent the powder 100 from softening significantly or flowing away in the heat-fusion step. Letting a temperature at which the storage elastic modulus of the powder 100 is 1 MPa be T° C., the storage elastic modulus of the powder 100 is preferably 0.1 MPa or more and 1 MPa or less in the temperature range of T° C. to (T+10)° C., more preferably 0.1 MPa or more and 1 MPa or less in the temperature range of T° C. to (T+20°) C, particularly preferably 0.1 MPa or more and 1 MPa or less in the temperature range of T° C. to a temperature lower than the decomposition temperature of the powder 100.

The powder 100 preferably has a storage elastic modulus equal to or higher than the storage elastic modulus of the structural material powder used in combination even at a temperature lower than the softening temperature of the powder 100. The powder 100 constitutes a support portion that supports an overhang portion of a structural part in an intermediate formed item after lamination. If the storage elastic modulus of the powder 100 is lower than the storage elastic modulus of the structural material powder, the support portion can fail to support the structural part laminated on the support portion. In this case, the structure of the intermediate formed item after lamination or the resulting three-dimensional object warps or sags by gravity, thus changing the shape of the intermediate formed item or the three-dimensional object. In contrast, the use of the powder 100 having a storage elastic modulus equal to or higher than the storage elastic modulus of the structural material powder even at a temperature lower than the softening temperature of the powder 100 can inhibit the change of the shape of a three-dimensional object, so that it is possible to produce a three-dimensional object with higher shape accuracy and higher dimensional accuracy.

The softening temperature of the powder 100 is preferably, but not necessarily, 75° C. or higher and 200° C. or lower. In this case, the powder 100 can be disposed in a layer-by-layer manner in combination with a constituent material powder composed of a thermoplastic resin such as ABS or PP used commonly, followed by heat fusion.

Moisture Resistance of Powder 100

When particles containing the water-soluble material 11 having a high water solubility is exposed to a high-humidity atmosphere, the particles can absorb moisture in the atmosphere. In this case, the viscosity of the particles is increased to aggregate or harden the particles, thereby losing the flowability of the powder. The loss of the flowability of the powder makes it difficult to arrange the powder at a predetermined position to form a particle layer, resulting in a three-dimensional object with low accuracy. Thus, the temperature of the storage environment and usage environment of the powder needs to be precisely controlled, increasing the production costs.

In contrast, the particles 1 in the powder 100 according to an embodiment contains the water-insoluble material 12 in addition to the water-soluble material 11 as described above, the water-insoluble material 12 acting as a viscoelasticity control agent. In this case, even if the water-soluble material 11 in the particles 1 absorbs moisture to decrease the storage elastic modulus, the water-insoluble material 12 inhibits the flow of the water-soluble material 11. This can inhibit the flowability of the powder 100.

The powder 100 has good moisture resistance in the form of powder and can be removed by bringing the powder 100 into contact with a water-containing liquid after the formation of a three-dimensional object. The powder 100 according to an embodiment has both moisture resistance and solubility in water, which are trade-off material properties. Thus, the powder 100 is easily handled in the form of powder and can be maintained at a state suitable for an additive manufacturing process without moisture control. The use of the powder 100 according to an embodiment as a support material powder enables the production of a high-accuracy three-dimensional object.

Although the powder 100 according to an embodiment is suitable as a support material powder for the production of a water-insoluble three-dimensional object, the applications thereof are not limited thereto. For example, when a water-soluble three-dimensional object is produced, the powder 100 may also be used as a structural material powder.

Shell

Figure 1B:
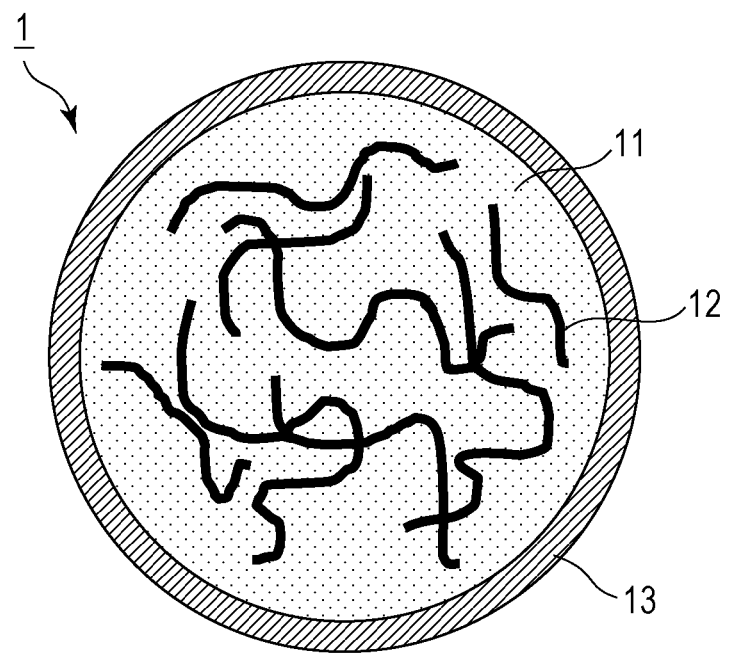
FIG. 1B schematically illustrates a cross-sectional structure of a thermoplastic particle contained in a powder according to an embodiment.

Preferably, each of the particles 1 according to an embodiment has a cross-sectional structure illustrated in FIG. 1B and a shell 13 that covers at least part of the surface of the particle containing the water-soluble material 11 and the water-insoluble material 12. In this case, the water solubility of the shell 13 is lower than the water solubility of the water-soluble material 11. The shell 13 may be composed of different types of materials. A material present in the largest amount in the shell 13 preferably has a water solubility less than 10, more preferably less than 5, even more preferably 1 or less.

The use of the particles 1 having the structure as illustrated in FIG. 1B enables the powder that has good moisture resistance in the form of powder and that can be removed by bringing the powder into contact with a water-containing liquid after lamination, for the following reason.

In an atmosphere having a high moisture content, such as a high-humidity environment, the presence of the shell 13 of the particles 1 according to an embodiment inhibits an increase in the viscosity of the surfaces of the particles 1 due to the moisture in the atmosphere, thereby inhibiting the aggregation of the particles 1 due to an increase in viscosity. Thus, the powder 100 according to an embodiment can be maintained at a state suitable for an additive manufacturing process without particular temperature control.

In the heat-fusion step of fusing the powder 100 and the structural material powder with each other in a process of producing a three-dimensional object, interfaces between particles disappear, and the particles are fused with each other to form a layer (sheet) or a formed item. At this time, the action of reducing the interfaces between different substances having different physical properties and materials is provided at the interfacial portions of the particles in order to reduce the total system energy, leading to the migration of molecules (atoms). As a result, the water-soluble material 11 in the particles 1 gather to form a network composed of the water-soluble material 11. At this time, because the proportion by volume of the shell 13 in each of the particles 1 is sufficiently lower than the proportion by volume of the water-soluble material 11 in each of the particles 1, the shell 13 is destroyed. In other words, the support portion is formed while the water-insoluble material 12 and the broken pieces of the shell 13 are dispersed in the network of the water-soluble material 11. Thus, the support portion formed of the powder 100 according to an embodiment can be easily removed from the formed item by bringing the network of the water-soluble material 11 into contact with water.

Examples of a material present in the largest amount in the shell 13 include, but are not limited to, organic substances such as organic compounds and polymers; inorganic substances such as metals and ceramics; and hybrids thereof.

Examples of organic substances include, but are not limited to, resins such as vinyl resins, polyester resins, epoxy resins, and urethane resins; ester compounds such as glycerol fatty acid esters, sucrose fatty acid esters, and sorbitan fatty acid esters; and some cellulose derivatives such as ethyl cellulose.

Examples of inorganic substances include, but are not limited to, inorganic oxides such as silicon oxide, titanium oxide, and alumina.

The main component of the water-soluble material 11 and the main component of the shell 13 are preferably different from each other. The use of the different main components of the water-soluble material 11 and the shell 13 inhibits the mixing of the water-soluble material 11 and the shell 13 during the fusion of the particles 1 to easily provide the advantages of the present invention.

The powder 100 may further contain a functional material such as a pigment or a dispersant, depending on the function of a target three-dimensional object.

Average Particle Size of Particles 1

The particles 1 preferably have, on a volume basis, an average particle size of 1 μm or more and 100 μm or less, more preferably 20 μm or more and 80 μm or less. The powder 100 preferably has, on a volume basis, an average particle size of 1 μm or more and 100 μm or less, more preferably 20 μm or more and 80 μm or less. The use of an average particle size of the powder 100 of 1 μm or more enables a layer having a large thickness to be formed in one operation in the lamination step described below, so that a three-dimensional object having a desired height can be produced in a small number of laminating operations. The use of an average particle size of the powder 100 of 100 μm or less facilitates the production of a three-dimensional object with high shape accuracy and high dimensional accuracy.

The average particle size on a volume basis can be determined with a commercially available particle size distribution analyzer. For example, when a LA-950 laser diffraction/scattering particle size distribution analyzer (available from HORIBA, Ltd.) is used, the average particle size can be measured as described below. The setting of measurement conditions and analysis of measured data are performed using accompanying dedicated software.

A batch cell containing a measurement solvent is placed on the LA-950 laser diffraction/scattering particle size distribution analyzer (available from HORIBA, Ltd.), and an optical axis and a background are adjusted. At this time, the solvent is preferably selected from solvents in which the particles contained in the powder 100 are not dissolved. To improve the dispersibility of the powder 100 measured, a dispersant may be appropriately added to the solvent, as needed.

The powder 100 to be measured is added to the batch cell until the transmittance of light emitted from a tungsten lamp reaches 95% to 90%, and then the particle size distribution is measured. From the thus obtained measurement results, the average particle size on a volume basis of the powder 100 can be calculated.

Circularity of Particles 1

The particles 1 contained in the powder 100 according to an embodiment preferably have an average circularity of 0.8 or more, more preferably 0.94 or more. When the particles 1 have an average circularity of 0.8 or more, the particles 1 are in point contact with each other. Thus, the particles 1 flow easily, and closest packed arrangement is easily obtained. The average circularity of the particles 1 can be defined as follows:

Circularity=(circumferential length of circle having the same area as projected area of particle)/(circumferential length of projected image of particle)

The term "projected area of particle" used here is defined as the area of a binarized particle image. The term "circumferential length of projected image of particle" is defined as the length of the outline of the image of the particle, the outline being obtained by connecting the edge points of the image of the particle. The circularity serves as an index to the degree of irregularity of the projected image of each of the particles 1. The circularity indicates 1.00 when the particles 1 have a completely spherical shape. A higher degree of complexity of the surface shape results in a lower circularity value.

The circularity of the particles 1 can be measured by the image processing of an image observed using, for example, an electron microscope or a flow-type particle image analyzer (for example, Model FPIA-3000, available from Toa Medical Electronics Co., Ltd.). The average circularity used here refers to the average of circularity values obtained by subjecting freely-selected 10 or more particles of the particles 1 to circularity measurement and averaging the resulting values of circularity.

Particle Size Distribution of Powder 100

In the particle size distribution of the powder 100 according to an embodiment, letting the average particle size on a volume basis of the powder 100 be Dv μm and letting the average particle size on a number basis of the powder 100 be Dn μm, Dv/Dn is preferably 1.00 or more and 10.0 or less. When the particle size distribution of the powder 100 is within the range described above, a three-dimensional object with high shape accuracy and high dimensional accuracy is easily produced. The particle size distribution of the powder 100 is preferred because the powder 100 can be suitably used in an additive manufacturing process using an electrophotographic method.

Decomposition Temperature of Powder 100

The decomposition temperature of the powder 100 can be measured with a commercially available thermogravimetric analyzer. Thermogravimetric analysis is an analytical method in which the weight of a sample is measured while the sample is heated. The weight decreases as a component of the sample binds to oxygen under heat to decompose. In this specification, when a predetermined amount of the powder 100 is heated from 25° C. in air, a temperature at which the weight reaches 90% of the original weight is defined as the decomposition temperature of the powder 100.

For example, when a differential thermogravimetric analyzer (TG-DTA, Thermo Plus TG 8120, available from Rigaku Corporation), which is a thermogravimetric analyzer, is used, measurement can be performed as described below.

The powder 100 to be measured is placed in a batch-type vacuum drying oven and heated at about 80° C. to about 100° C. for 4 to 5 hours in vacuum to remove water adsorbed on the surfaces and inside thereof. The drying may be performed in air. After the drying was completed, a predetermined weight of the powder 100 is placed in the TG-DTA, and then measurement is performed in an air atmosphere. With regard to measurement conditions, heating is performed from 25° C. to 300° C. at a rate of temperature increase of 10° C./min. A change in weight is measured at a sampling rate of 1 second.

Method for Producing Powder 100

Any method for producing the particles 1 contained in the powder 100 according to an embodiment can be employed. Each of the particles 1 preferably has a structure in which the water-insoluble material 12 is uniformly dispersed in the water-soluble material 11. Examples of a method for producing the powder 100 containing the particles 1 having the structure are described below.

A first method is a spray dry method in which a powder is produced by dispersing the water-insoluble material 12 in a solution containing the water-soluble material 11 to prepare a stock solution and spraying the stock solution into a gas to rapidly perform drying. This method is preferred because the resulting powder has relatively uniform average particle size and circularity.

A second method is a mixing pulverization method in which a powder is produced by melt-mixing the water-soluble material 11 and the water-insoluble material 12 to prepare a solid and then pulverizing the resulting solid. This method enables the powder to be produced at a low cost.

The powder 100 may be produced by another method, for example, a mechanical pulverization method or a melt dispersion cooling method in which a material in a molten state is dispersed in a medium and cooled into a powder.

After the powder is produced by any of these methods, a functional material such as a pigment or a dispersant may be further added, depending on the function of a target three-dimensional object.

While the powder 100 according to the embodiment has been described, the present invention is not limited thereto and can also be applied to forms other than powder. That is, the foregoing thermoplastic composition itself is also included in the present invention. Specific examples of the form of the thermoplastic composition include, but are not limited to, pellets, rods, and filaments in addition to powders. As described above, the water-soluble material 11 contained in the thermoplastic composition according to the embodiment is preferably a water-soluble sugar, and the water-insoluble material 12 is preferably cellulose nanofibers. The thermoplastic composition according to the embodiment is suitable as a support material for use in an additive manufacturing process. This is because the thermoplastic composition satisfies mechanical properties required as a support material to support the structural material and can be easily removed by bringing the thermoplastic composition into contact with a water-containing liquid after lamination.

Method for Producing Three-Dimensional Object

An exemplary method for producing a three-dimensional object with a water-soluble support material by an additive manufacturing process will be described below. Properties required for a constituent material powder used in the additive manufacturing process will also be described.

In a method for producing a three-dimensional object according to an embodiment, a water-insoluble structural material powder and a water-soluble support material are used as constituent material powder. The powder 100 containing the particles 1 with a structure illustrated in FIG. 1A or 1B is used as the support material powder. The method for producing a three-dimensional object according to the embodiment includes the steps [1] to [3]:

[1] the step of forming a particle layer by disposing the structural material powder and the support material powder at predetermined positions (particle layer formation step);

[2] the step of forming an intermediate item by heating and laminating the particle layer (lamination step); and

[3] the step of removing a portion formed of the support material powder from the intermediate item by bringing the intermediate item into contact with a water-containing liquid (removal step).

The term "intermediate item" used here refers to a formed item that is in a state before a target three-dimensional object is completed. That is, the intermediate item includes a portion (support portion) formed of the support material powder at a portion to be a space (hollow space) in a target three-dimensional object.

The steps (1) and (2) are repeated to laminate the particle layers as many as required, thereby forming the intermediate item. The intermediate item is subjected to step [3]. Specifically, the support portion of the intermediate item is brought into contact with the water-containing liquid to selectively remove the support portion to provide the target three-dimensional object.

The steps will be described in detail below.

[1] Step of Forming Particle Layer by Disposing Structural Material Powder and Support Material Powder (Particle Layer Formation Step)

In this step, the structural material powder and the support material powder are disposed on the basis of the cross-sectional data of the target three-dimensional object. When particles are fused by application of thermal energy in the step of laminating the particle layers described below, the structural material powder or the support material powder preferably contains a thermoplastic material.

The shape of particles contained in the structural material powder used in an embodiment is not limited to a spherical shape and may be a sphere, a polygonal column, a cylindrical column, an elliptic column, or an indefinite shape in which deformed shapes thereof are mixed.

Generally, particles produced by pulverization tend to have an indefinite shape, and particles produced by precipitation from a solution tend to have a spherical shape or a shape derived from its crystal form.

The glass transition temperatures, the softening temperatures, and the melting temperatures of the structural material powder and the support material powder can be appropriately selected, depending on a temperature at which the particle layers are fused in the subsequent lamination step (2), and are preferably 40° C. or higher and 300° C. or lower.

At 40° C. or higher, the resulting three-dimensional object is less prone to be deformed at a temperature of the surrounding environment. At 300° C. or lower, operations in the heat-fusion step (step [2]) are easily controlled.

The particle layers may be formed by arranging particles in a point-by-point, line-by-line, or plane-by-plane manner. A method for arranging particles in a line-by-line, or plane-by-plane manner is preferred in view of the rate of formation. An example of a method for forming a particle layer by arranging particles in a plane-by-plane manner is an electrophotographic method.

To form a particle layer by arranging particles in a line-by-line or plane-by-plane manner, a known method such as a method using electrostatic action due to electrification may be employed. When the particle layers including different types of constituent material powder are formed as described in the embodiment, an electrophotographic method using an electrostatic force is preferred from the viewpoint of achieving a low level of pollution of members and high durability.

In the case where the powder 100 according to an embodiment is used in an additive manufacturing process using the electrophotographic method, the charge decay, which is a problem that arises in the constituent material powder containing the water-soluble material, is suppressed. Generally, a constituent material powder containing a water-soluble material easily absorbs moisture in a surrounding gas to easily increase the viscosity of constituent material particles contained in the constituent material powder. This decreases the flowability of the powder to decrease the number of contacts between the particles, leading to the decay of charge.

In contrast, the powder 100 according to an embodiment contains the water-insoluble material 12 in addition to the water-soluble material 11 and thus can inhibit an increase in the viscosity of the particles 1 due to the absorption of moisture. This maintains the flowability of the powder 100 and the number of contacts between the particles, thus suppressing the decay of charge.

Figure 2:
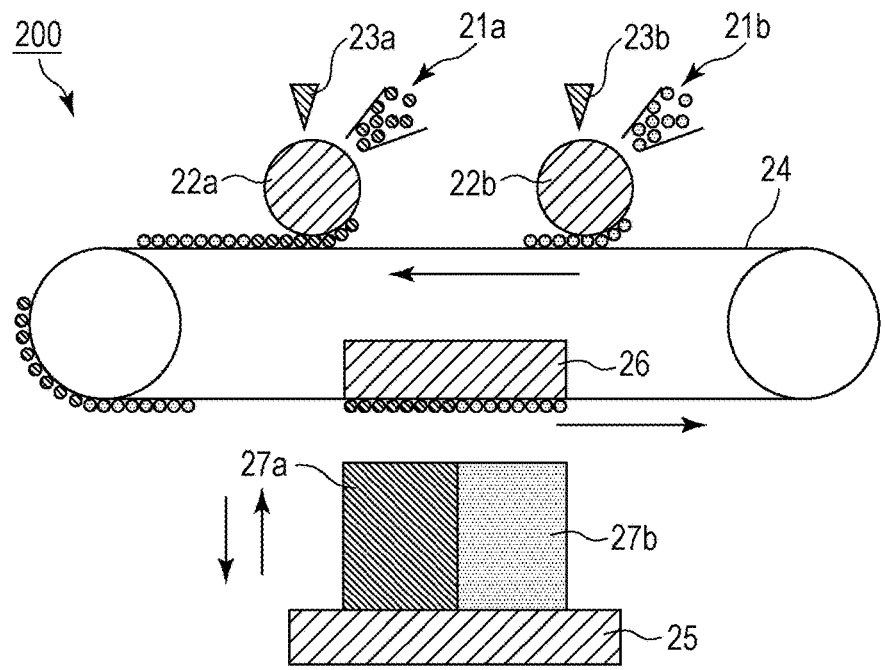
FIG. 2 schematically illustrates a structure of an apparatus for forming a three-dimensional object according to an embodiment.
Figure 4A:
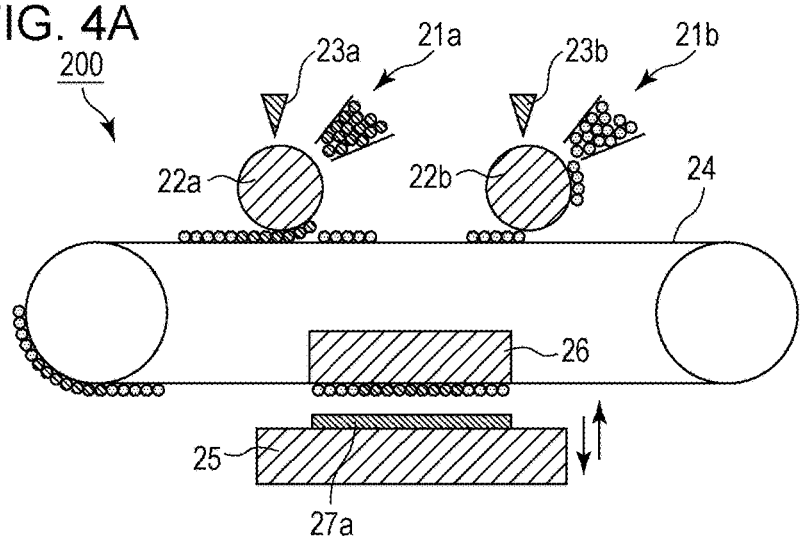
FIGS. 4A to 4C schematically illustrate a method for producing a three-dimensional object according to an embodiment.
Figure 4B:
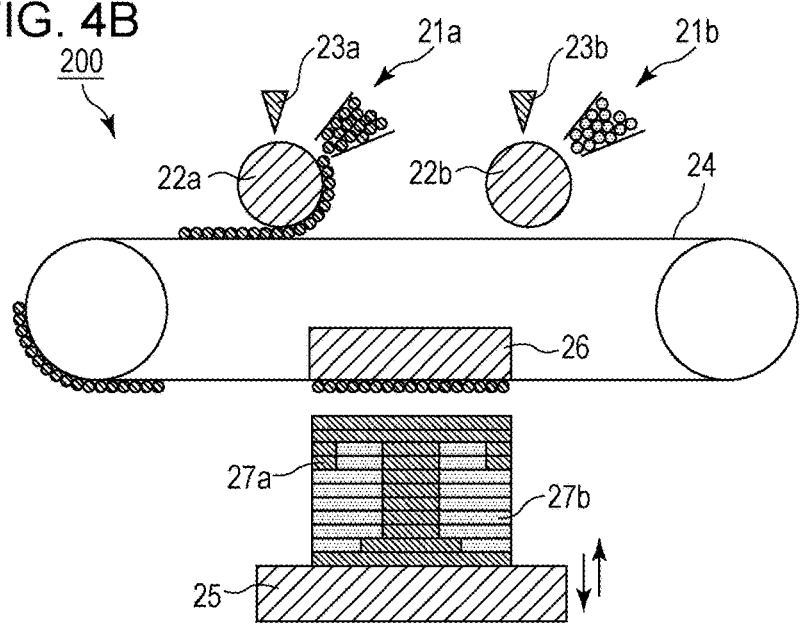
Figure 4C:
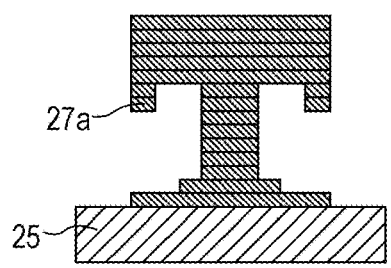

As an example of the particle layer formation step [1], a step of forming a particle layer by an electrophotographic method will be described with reference to FIG. 2. FIGS. 2 and 4A to 4B schematically illustrate a structure of an apparatus for forming a three-dimensional object by an electrophotographic method. FIGS. 4A to 4C schematically illustrate a method for producing a three-dimensional object according to an embodiment, and FIG. 4C schematically illustrates a completed three-dimensional object.

An apparatus for forming a three-dimensional object 200 according to an embodiment (hereinafter, referred to as an "apparatus 200") includes developing devices 21, image bearing members 22, exposure devices 23, an intermediate supporting and conveying belt 24, a stage 25, and a temperature control device 26. In the particle layer formation step [1] in the method for producing a three-dimensional object according to the embodiment, a particle image composed of a structural material powder is formed on an image bearing member 22a, and a particle image composed of a support material powder is formed on an image bearing member 22b. These particle images are transferred to the intermediate supporting and conveying belt 24 to form a particle layer formed of the structural material powder and the support material powder.

The particle layer formation step will be described in detail below. In common description of the formation of particle images, the suffixes a and b of the reference numerals attached to the constituent members are omitted. For example, the developing devices 21, the image bearing members 22, and so forth are used.

First, the image bearing members 22 are uniformly charged with charging devices (not illustrated). Any charging method may be employed.

The charged image bearing members 22 are exposed with the exposure devices 23 according to the slice data of a three-dimensional object to be produced to form electrostatic latent images on the surfaces of the image bearing members 22. Specifically, in the slice data (cross-sectional data) of the three-dimensional object, an electrostatic latent image corresponding to a structural region is formed on the image bearing member 22a, and an electrostatic latent image corresponding to a support region is formed on the image bearing member 22b.

Subsequently, the constituent material powder is supplied from the developing devices 21 to the image bearing members 22. The constituent material powder is arranged on regions of the surfaces of the image bearing members 22 where the electrostatic latent images are formed or are not formed. This visualizes the electrostatic latent images. Specifically, the particle image formed of the structural material powder can be formed on the surface of the image bearing member 22a, and the particle image formed of the support material powder can be formed on the surface of the image bearing member 22b.

The particle images on the image bearing members 22a and 22b are transferred to the intermediate supporting and conveying belt 24 at a predetermined timing. This results in the formation of a particle layer formed of the particle image of the structural material powder and the particle image of the support material powder. Specifically, a first layer formed by arranging one of the structural material powder and the support material powder is transferred to the intermediate supporting and conveying belt 24, and then a second layer formed by arranging the other powder is transferred to the intermediate supporting and conveying belt 24 to form the particle layer. The order in which the particle images are transferred to the intermediate supporting and conveying belt 24 is not particularly limited. After the transfer of the particle image formed of the structural material powder, the particle image formed of the support material powder may be transferred. The transfer may be performed in reverse order.

[2] Step of Forming Intermediate Item by Laminating Particle Layers (Lamination Step)

This step is a step of repeatedly laminating the particle layers formed in the preceding step to form the intermediate item. With regard to the lamination of the particle layers, a separately formed particle layer may be laminated on a surface of a particle layer that has been previously formed. The lamination may be performed by directly forming a new particle layer on a surface of a particle layer that has been previously formed. In the case where the separately formed particle layer is laminated on the surface of the particle layer that has been previously formed, a particle layer may be temporarily formed on a base member and then transferred to the surface of the particle layer that has been previously formed. The base member used here is referred to as a transfer member. When the particle layer is transferred to the transfer member, a known transfer method, such as electrostatic image transfer using electrostatic energy, can be employed.

An example of the lamination step [2] will be described below with reference to FIG. 2. Assuming that the particle layer formation step [1] is performed by, but not limited to, the foregoing electrophotographic method, the description will be made.

The particle layer formed on the intermediate supporting and conveying belt 24 is conveyed to a lamination position by rotation of the intermediate supporting and conveying belt 24. When the particle layer is arrived at the lamination position, the particle layer is heated with the temperature control device 26 to fuse particles included in the particle layers. The particle layer is transferred and laminated on the upper surface of the stage 25 or on the intermediate item, in process, formed on the stage 25. The region of the particle layer formed of the structural material powder is laminated on a portion constituting the three-dimensional object (structural portion 27a), and the region formed of the support material powder is laminated on a support portion 27b. The lamination step in the method for producing a three-dimensional object according to the embodiment includes the heat-fusion step.

The timing at which the particles in the particle layer are fused by heating the particle layer is not particularly limited. The fusion by heating may be performed before the lamination, simultaneously with the lamination, or after the lamination. Furthermore, the fusion by heating may be performed at multiple timings selected from them.

When the particle layer is laminated on the upper surface of the stage 25 or on the intermediate item, in process, formed on the stage 25, if the constituent material powder constituting the particle layer has absorbed moisture, the following problem arises. Generally, when a constituent material powder absorbs moisture, the storage elastic modulus of the constituent material powder is reduced, and the storage elastic modulus at a temperature at which the particles constituting the particle layer are fused (heat-fusion temperature) by the temperature control in the heat-fusion step is also reduced. After the completion of the lamination, when the stage 25 is lowered to separate the intermediate item from the intermediate supporting and conveying belt 24, the separation is not sufficiently performed, and the constituent material is left on the surface of the intermediate supporting and conveying belt 24 (untransferred material). This problem is more prominent when a powder containing a larger amount of a water-soluble material is used as the constituent material powder.

In contrast, in the method for producing a three-dimensional object according to the embodiment, the powder 100 is used as a support material powder. Because the water-insoluble material 12 contained in the powder 100 suppresses a change in viscosity due to the absorption of water, despite the high water-soluble material content, the powder 100 can solve the problem of the untransferred material on the intermediate supporting and conveying belt 24.

In the heat-fusion step, both of the structural material powder and the support material powder in the particle layer are heated with the temperature control device 26 in such a manner that both powers are controlled to have substantially the same temperature. At this time, the structural material powder and the support material powder are preferably heated with the temperature control device 26 at a temperature at which both of the structural material powder and the support material powder are softened. Thus, when the structural material powder and the support material powder have different softening temperatures, the heating is preferably performed with the temperature control device 26 at a temperature equal to or higher than the higher of the softening temperatures.

Specifically, when the structural material powder is heated, the heating is preferably performed in the temperature range including a temperature at which the storage elastic modulus of the structural material powder is 1 MPa or less. The use of the structural material powder having a storage elastic modulus within the range can enable the structural material powder to be softened.

When the structural material powder and the support material powder have markedly different softening temperatures and markedly different storage elastic moduli, nonuniformity in hardness is observed in the particle layer. If the storage elastic moduli are significantly decreased when the powders are softened, a portion formed of the relatively softer powder is deformed, a change in shape such as depressions or collapse occurs. This causes a problem that a difficulty lies in laminating the structural material powder and the support material powder in combination.

The problem is particularly prominent when the support material powder contains a water-soluble organic material. When the support material powder contains the water-soluble organic material, the softening temperature of the support material powder is generally lower than the softening temperature of the water-insoluble structural material powder. Thus, a temperature range used in the heat-fusion step is set to a temperature range including the softening temperature of the structural material powder. In this case, when the support material powder is heated to the softening temperature of the structural material powder, the support material powder is heated to a temperature that is markedly higher than the softening temperature of support material powder, thereby significantly softening the support material powder.

In contrast, in the method for producing a three-dimensional object according to the embodiment, the powder 100 is used as the support material powder. In the powder 100 according to the embodiment, the storage elastic modulus of the powder 100 is always higher than the loss elastic modulus of the powder 100 in the temperature range of a temperature at which the storage elastic modulus of the powder 100 is 1 MPa to the heating temperature in the second step. Thus, the problem with the change in shape during lamination can be solved.

A powder containing a water-soluble organic material is liable to be tacky when heated. The occurrence of tackiness is disadvantageous to lamination. In contrast, the viscoelastic properties of the powder 100 according to the embodiment meet the relationship described above; hence, the occurrence of tackiness of the powder 100 in the heat-fusion step can be inhibited.

Preferably, the storage elastic modulus of the powder 100 is always higher than 0.1 MPa in the temperature range in the heat-fusion step. This can prevent the powder 100 from softening significantly to flow in the heat-fusion step.

As described above, the water-insoluble material 12 contained in the powder 100 according to the embodiment preferably has a higher softening temperature than the upper limit temperature of the temperature range in the heat-fusion step. In this case, the water-insoluble material 12 can inhibit a reduction in the storage elastic modulus of the powder 100 during the heat-fusion step. [3] Step of Removing Portion of Intermediate Item Formed of Support Material Powder by Bringing Portion into Contact with Water-Containing Liquid (Removal Step)

This step is a step of removing a portion of the intermediate item formed of the support material powder (support portion), the intermediate item being formed by repeating the steps [1] and [2]. The support portion is removed by bringing the intermediate item into contact with a water-containing liquid.

The removal step [3] is not particularly limited as long as the support portion can be removed by bringing the intermediate item into contact with the water-containing liquid. An example of such a method is a method in which the intermediate item is immersed in the water-containing liquid.

The water-containing liquid is not particularly limited as long as it contains water. For example, a liquid containing a material such as a pH-adjusting material may be used. In such a case, the material such as a pH-adjusting material is preferably present in an amount of 5% or less by weight of the water.

Figure 3:
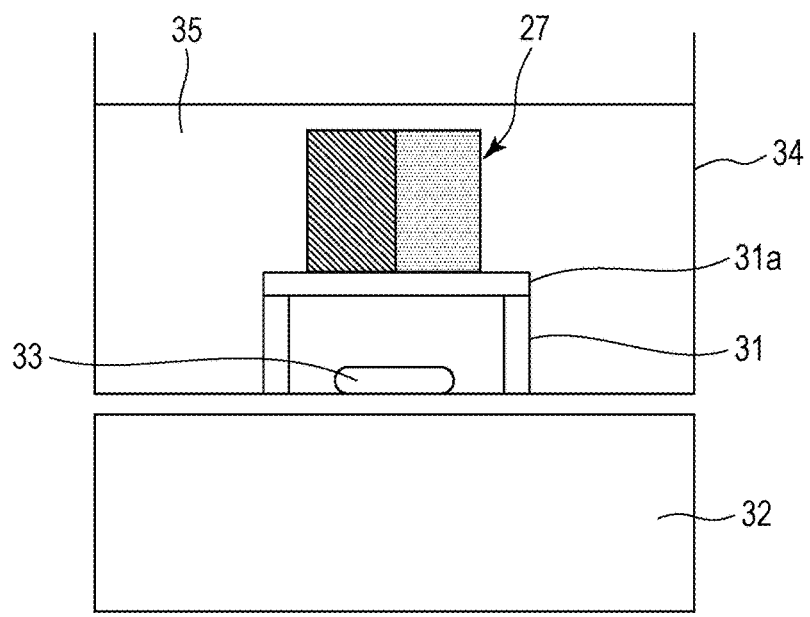
FIG. 3 schematically illustrates a removal apparatus used in a removal step in a method for producing a three-dimensional object according to an embodiment.

A specific example of a method of immersing the intermediate item in the water-containing liquid will be described with reference to FIG. 3. FIG. 3 schematically illustrates a structure of a removal apparatus used to remove the support portion 27b from an intermediate item 27. The removal apparatus includes a platform 31 where the intermediate item 27 is placed, a magnetic stirrer 32, and a stirrer bar 33.

The stirrer bar 33 is spun with the magnetic stirrer 32 to stir a water-containing liquid 35 charged in a vessel 34 of the removal apparatus. The support portion 27b of the intermediate item 27 is mainly composed of the water-soluble material and thus is dissolved by contact with the water-containing liquid 35, thereby removing the support portion 27b. A stage portion 31a of the platform 31 preferably has a net shape in such a manner that the streams of water uniformly hit the intermediate item 27. To increase the speed of the removal of the support portion 27b from the intermediate item 27 in the removal step, for example, the temperature control (for example, heating) of the water-containing liquid 35 and the application of ultrasonic vibration to the water-containing liquid 35 may be performed. The support portion 27b can also be removed by immersing the intermediate item 27 in the water-containing liquid 35 and allowing the intermediate item 27 to stand for a certain period of time.

To more rapidly remove the support portion 27b, the water-containing liquid 35 may be blown on the intermediate item 27 by jetting the water-containing liquid 35 through a nozzle (not illustrated) of a spray or the like. In this case, the water-containing liquid 35 is preferably blown at a water pressure or flow velocity to the extent that the structural portion 27a is not damaged. To uniformly blow water on the intermediate item 27, multiple nozzles may be used, and a nozzle that can be moved may be used for the intermediate item 27. As the nozzle, a common nozzle for a spray may be used. The diameter of the nozzle and the number of nozzles may be appropriately selected, depending on the size of the target intermediate item 27 and the type of the support material powder.

EXAMPLES

While examples will be described below, the present invention is not limited to these examples.

Preparation of Powder 1

As the water-soluble material 11, 2.80 kg of maltotetraose (Nisshoku Fuji Oligo #450, available from Nihon Shokuhin Kako Co., Ltd.) and 1.20 kg of lactitol anhydride LC-0 (available from B Food Science Co., Ltd.) were used. As the water-insoluble material 12, 1 kg (solid content) of cellulose nanofibers (available from Daicel FineChem Ltd.) was used. The proportion by mass of the water-insoluble material 12 was 20% based on the total of the water-soluble material 11 and the water-insoluble material 12. As the cellulose nanofibers, 5 kg of a dispersion (Celish, water:cellulose nanofibers=80:20 (by weight), available from Daicel FineChem Ltd.) was used.

Figure 5:
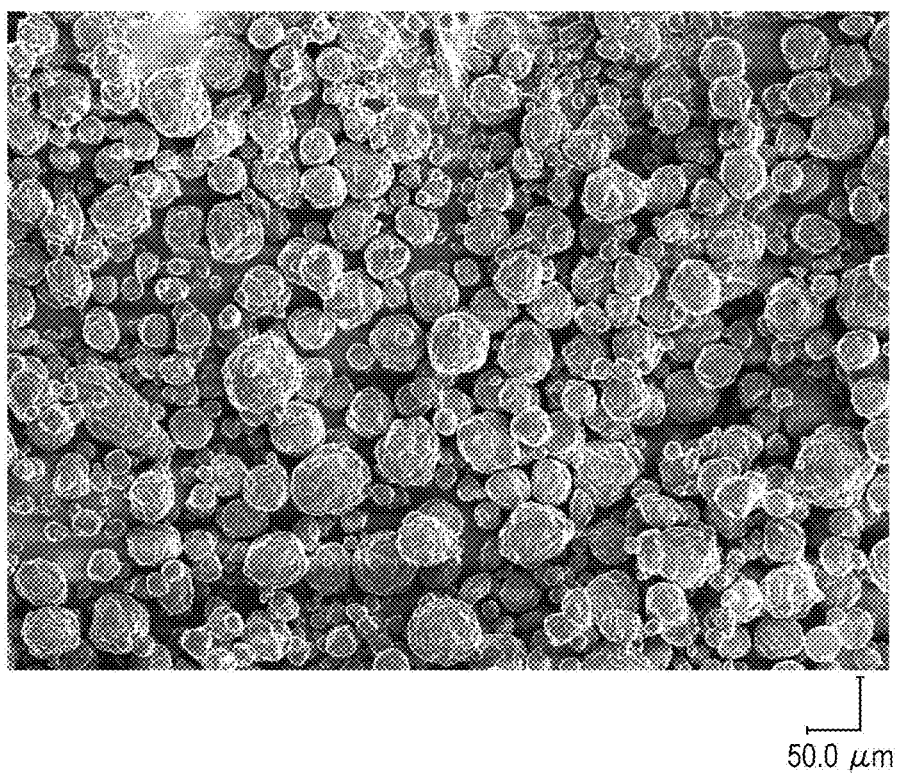
FIG. 5 is an electron microscope image of a powder of Example 1.
Figure 6A:
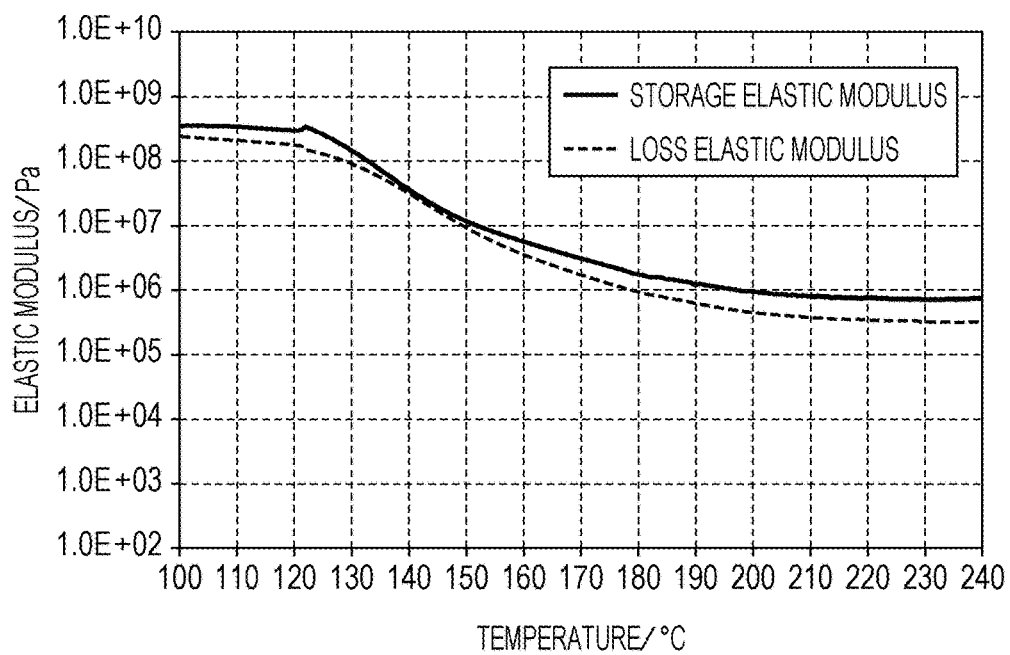
FIG. 6A is a graph of the storage elastic modulus and the loss elastic modulus of the powder of Example 1.
Figure 6B:
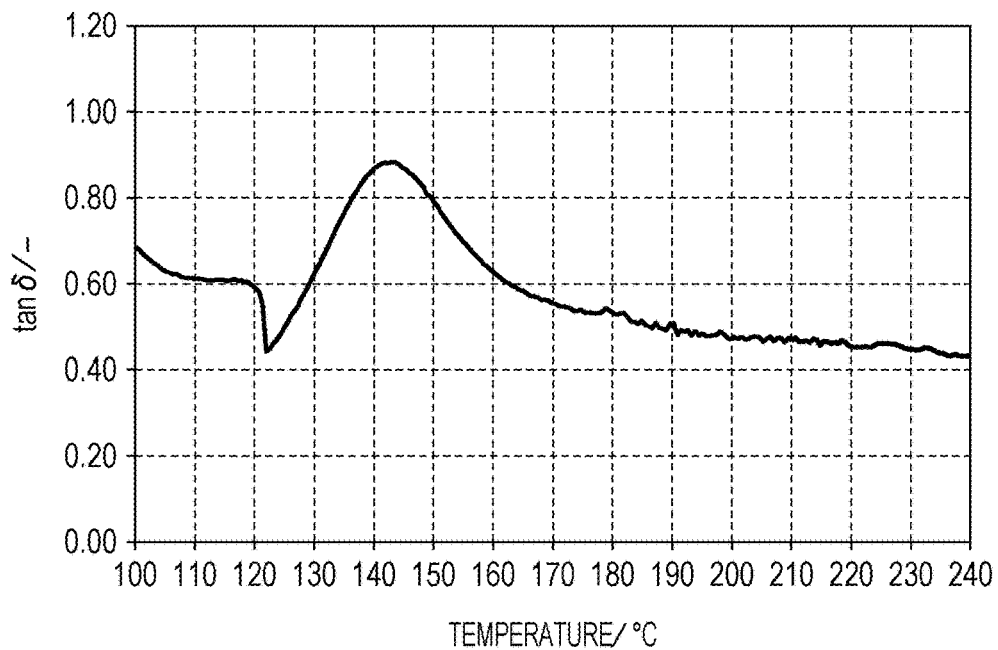
FIG. 6B is a graph of tan δ of the powder of Example 1.
Figure 7A:
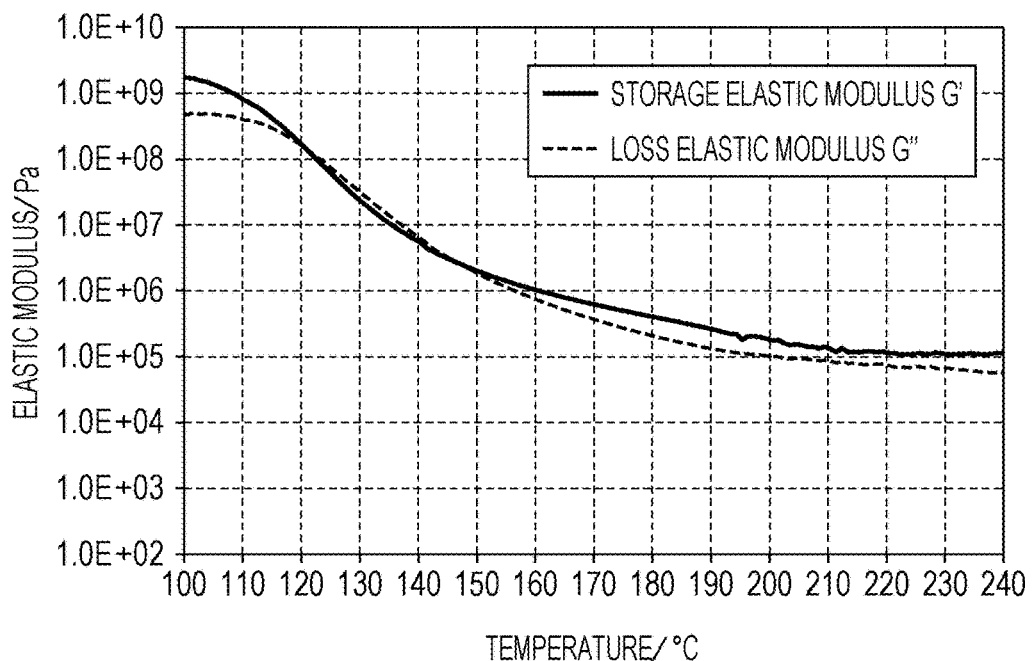
FIG. 7A is a graph of the storage elastic modulus and the loss elastic modulus of a powder of Example 2.
Figure 7B:
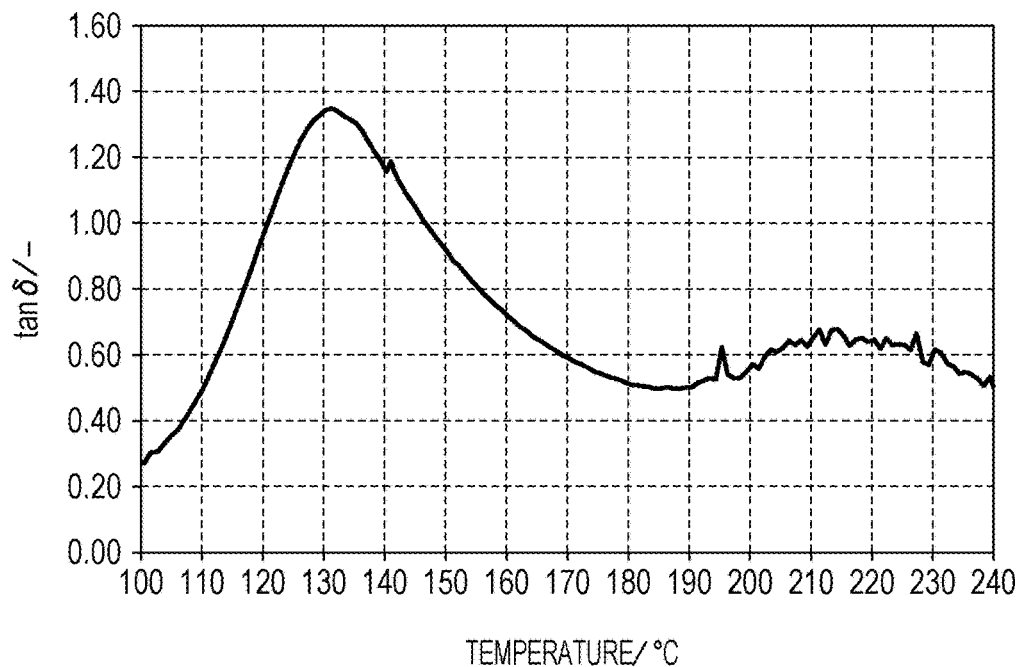
FIG. 7B is a graph of tan δ of the powder of Example 2.
Figure 8A:
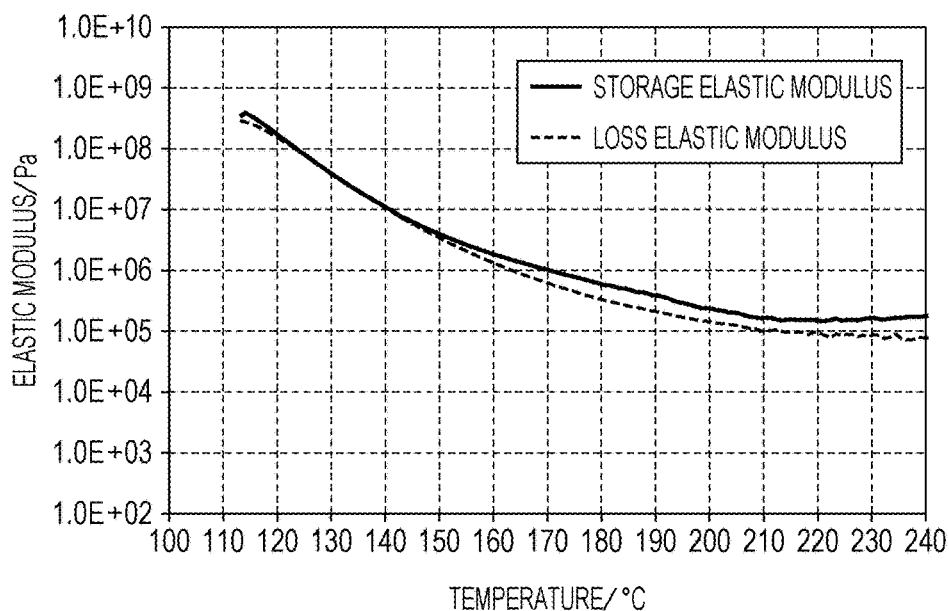
FIG. 8A is a graph of the storage elastic modulus and the loss elastic modulus of a powder of Example 3.
Figure 8B:
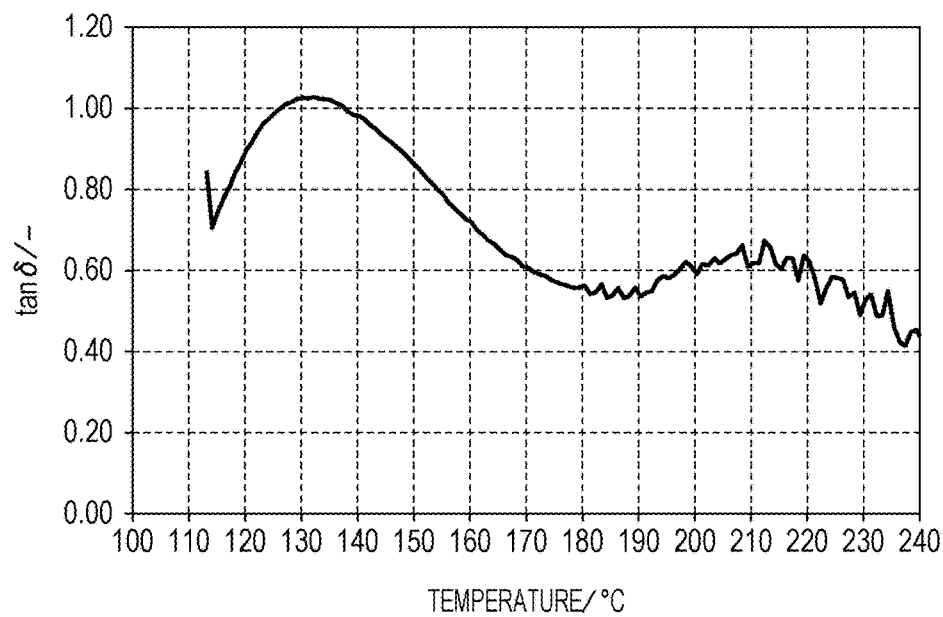
FIG. 8B is a graph of tan δ of the powder of Example 3.
Figure 9A:
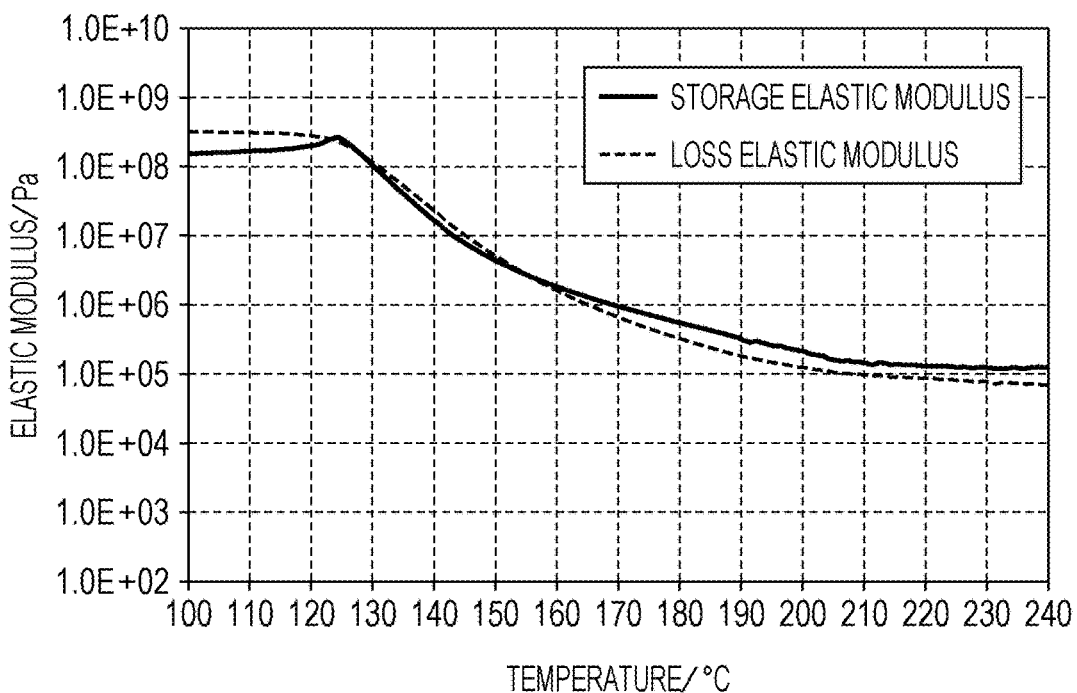
FIG. 9A is a graph of the storage elastic modulus and the loss elastic modulus of a powder of Example 4.
Figure 9B:
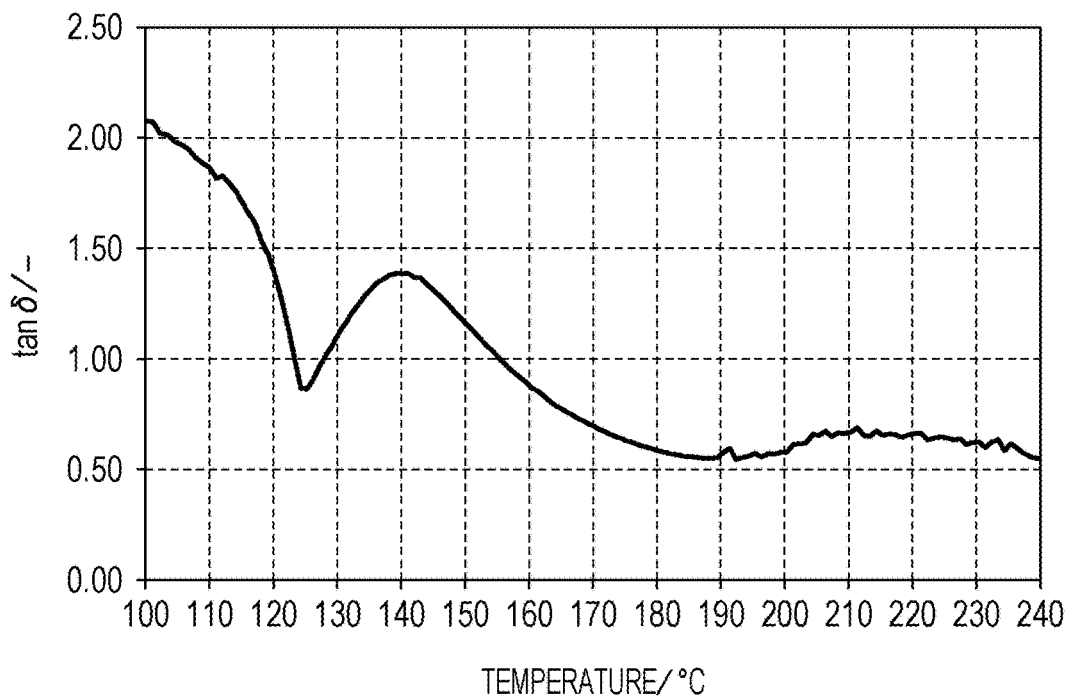
FIG. 9B is a graph of tan δ of the powder of Example 4.
Figure 10A:
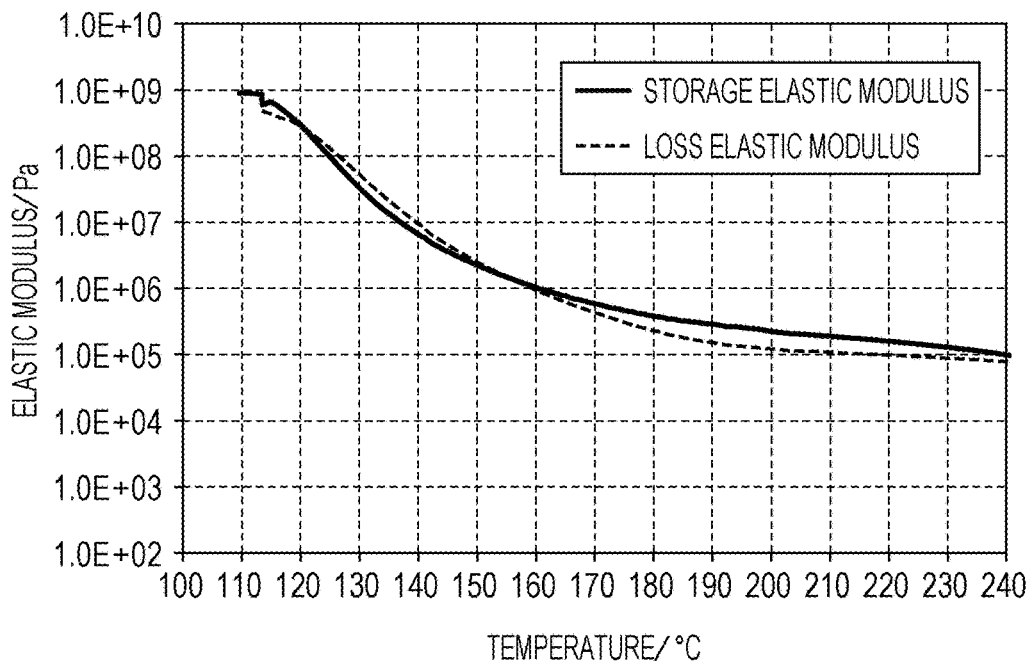
FIG. 10A is a graph of the storage elastic modulus and the loss elastic modulus of a powder of Example 5.
Figure 10B:
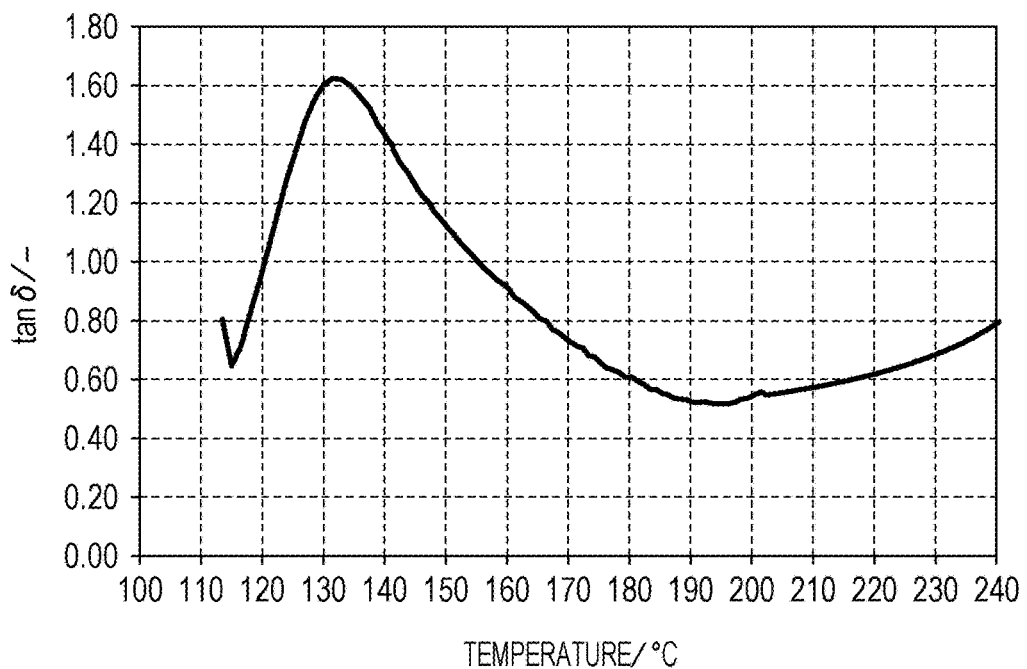
FIG. 10B is a graph of tan δ of the powder of Example 5.
Figure 11A:
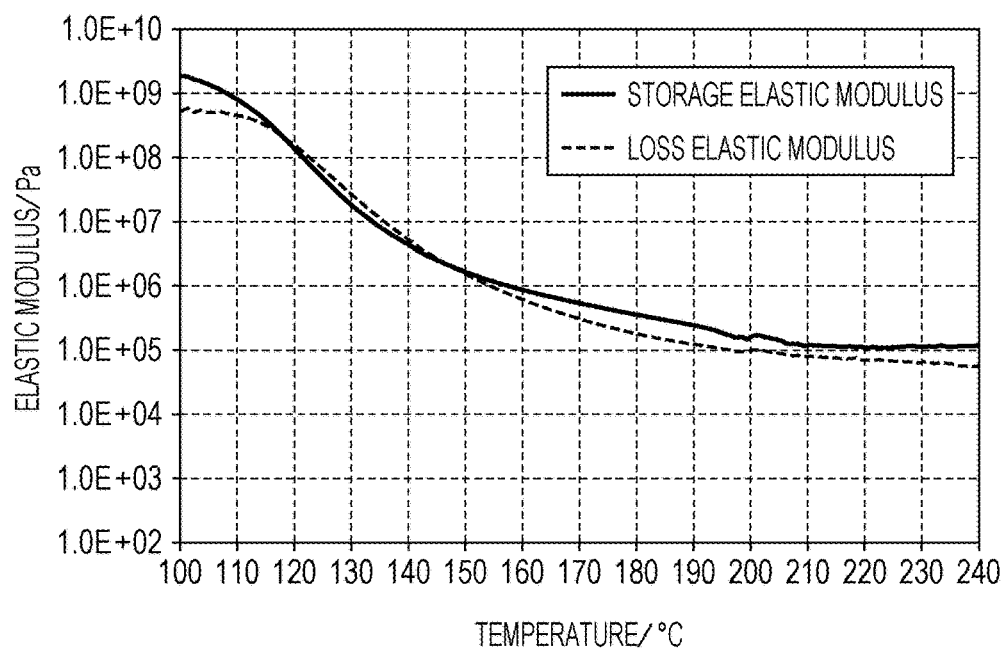
FIG. 11A is a graph of the storage elastic modulus and the loss elastic modulus of a powder of Example 6.
Figure 11B:
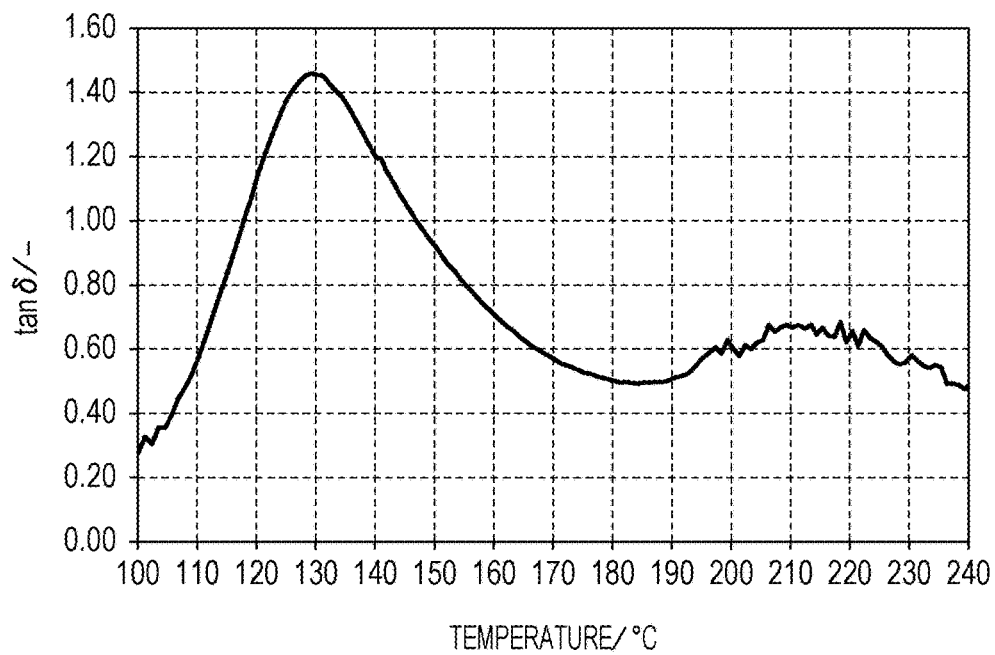
FIG. 11B is a graph of tan δ of the powder of Example 6.
Figure 12A:
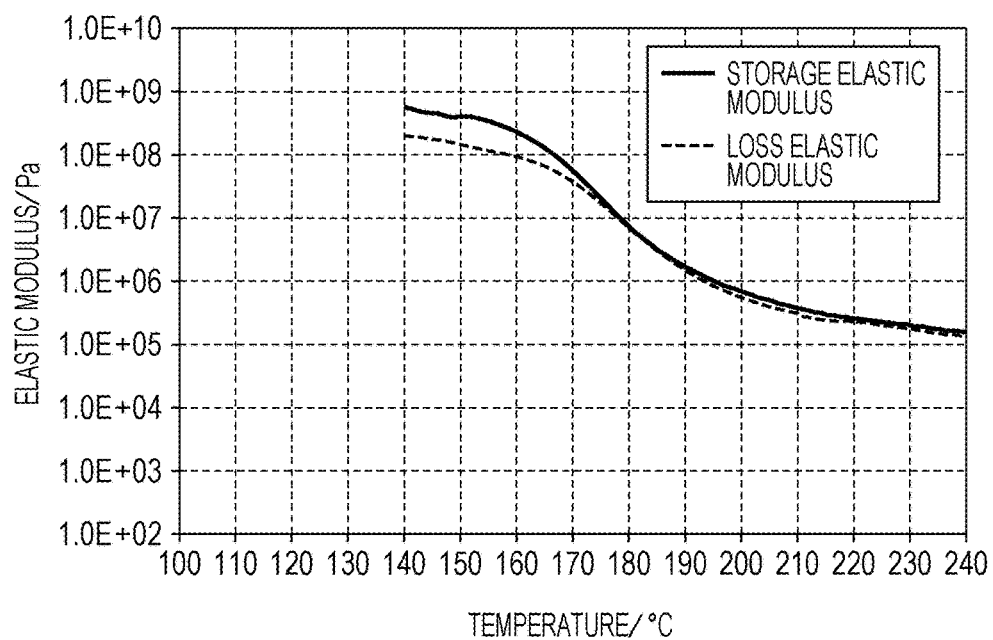
FIG. 12A is a graph of the storage elastic modulus and the loss elastic modulus of a powder of Example 7.
Figure 12B:
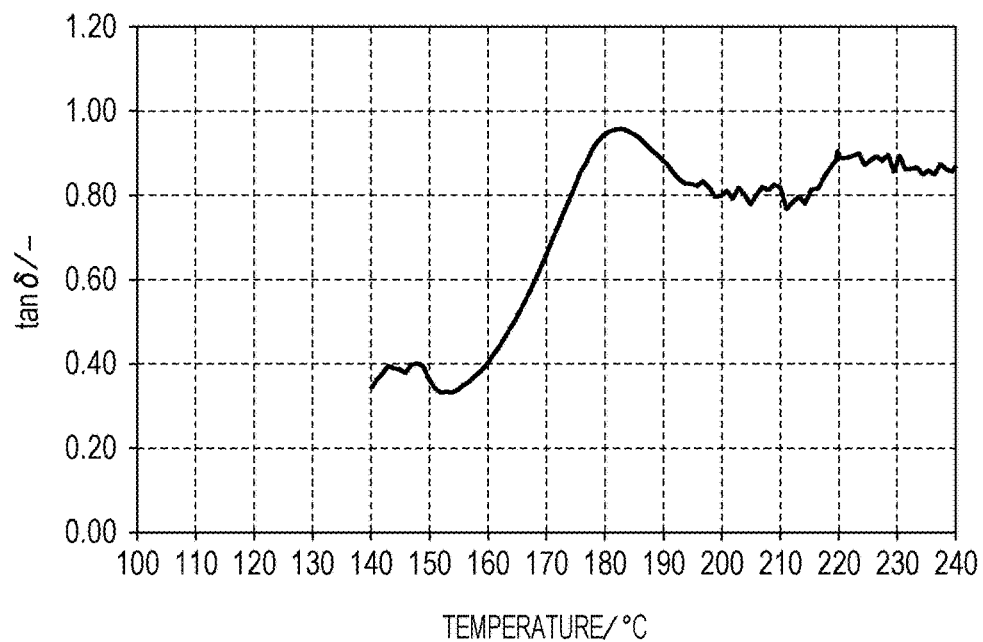
FIG. 12B is a graph of tan δ of the powder of Example 7.
Figure 13A:
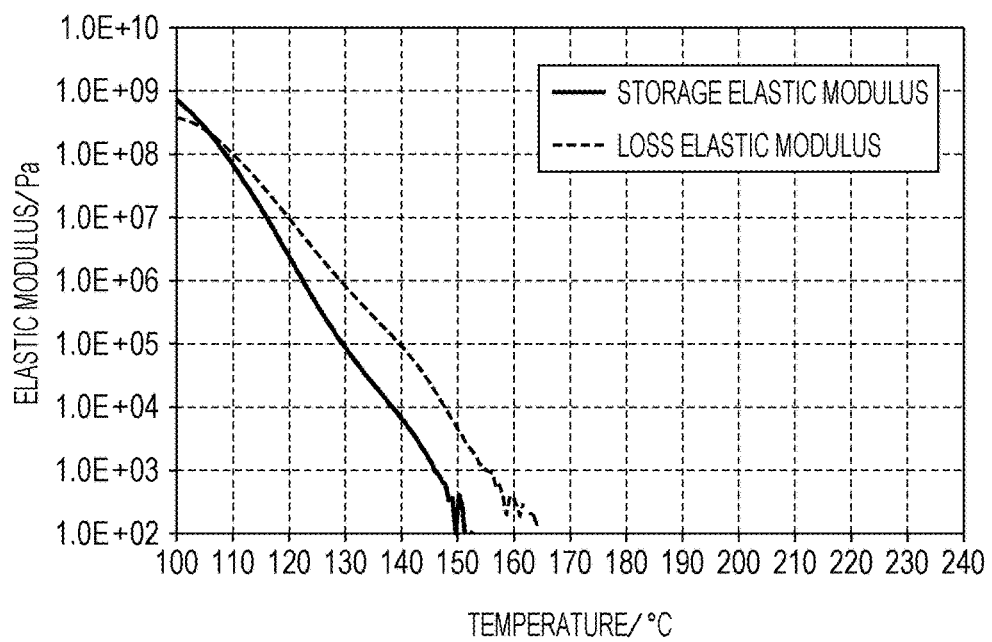
FIG. 13A is a graph of the storage elastic modulus and the loss elastic modulus of a powder of Comparative example 1.
Figure 13B:
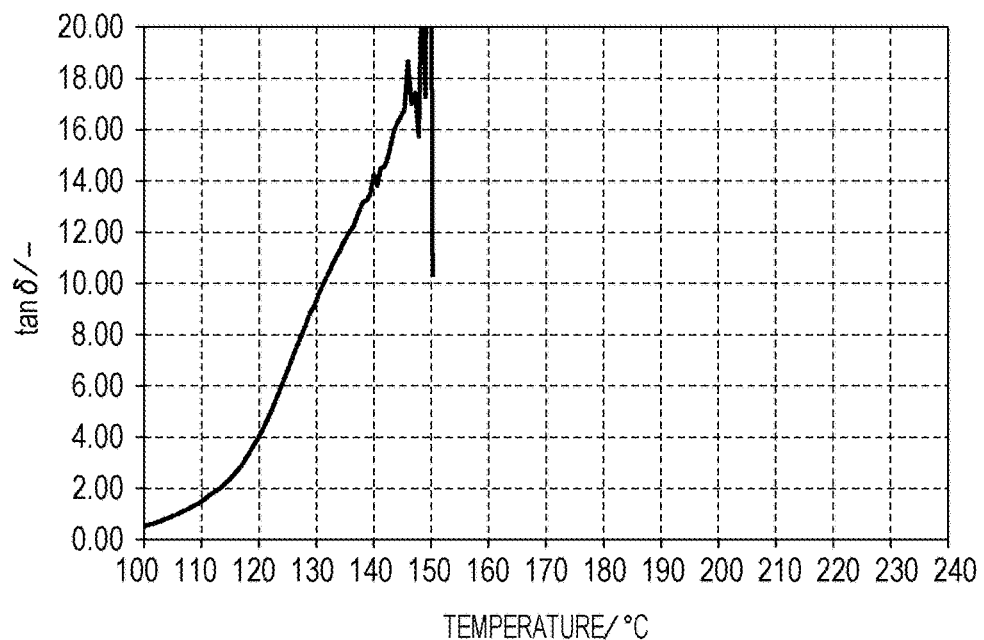
FIG. 13B is a graph of tan δ of the powder of Comparative example 1.
Figure 14A:
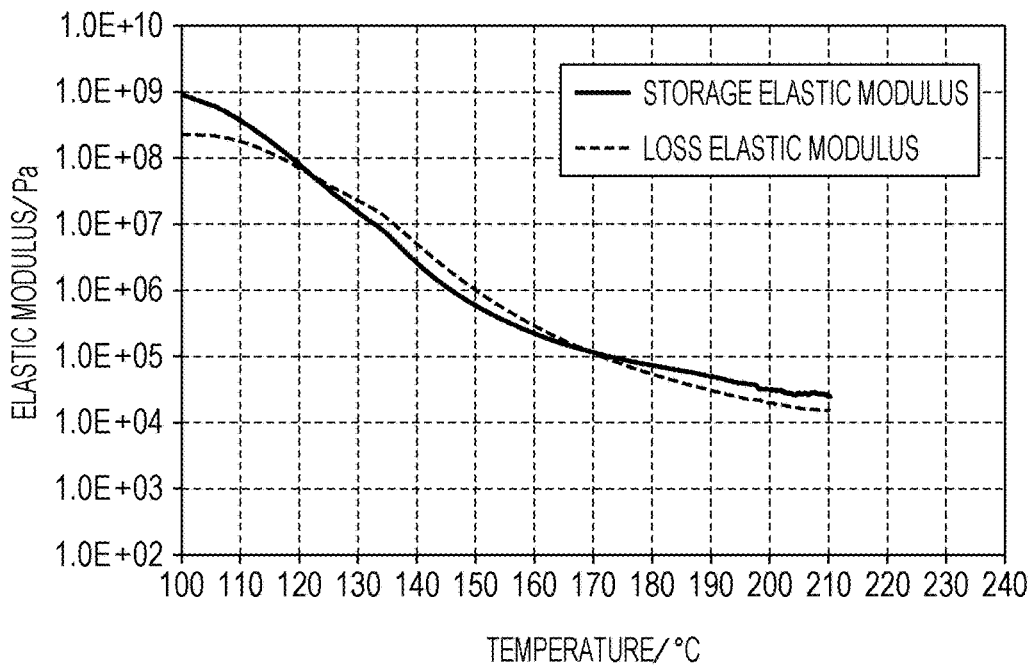
FIG. 14A is a graph of the storage elastic modulus and the loss elastic modulus of a powder of Comparative example 2.
Figure 14B:
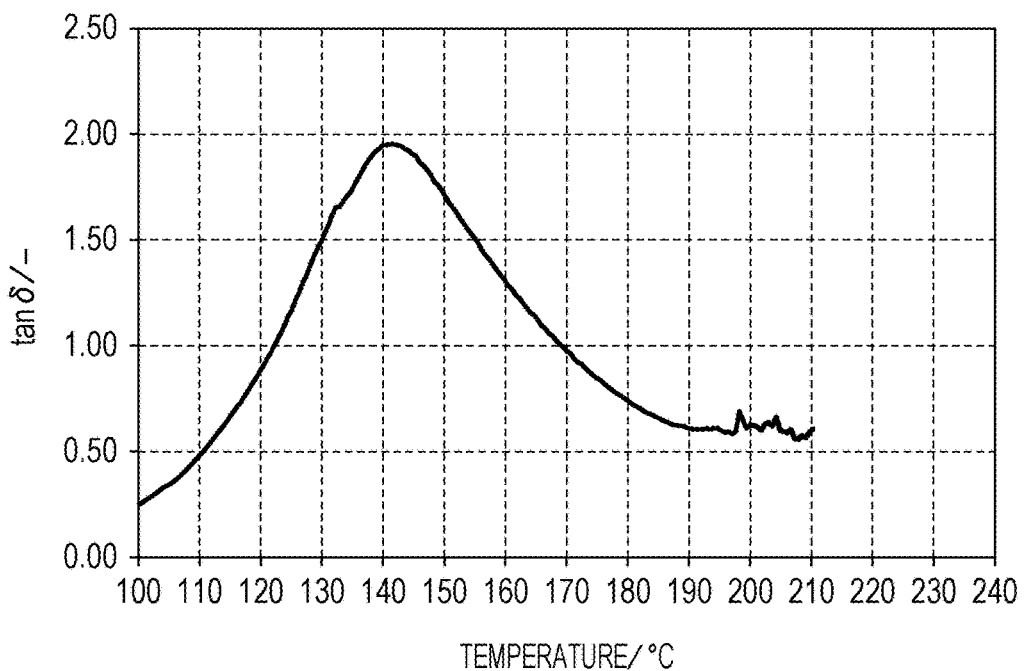
FIG. 14B is a graph of tan δ of the powder of Comparative example 2.
Figure 15A:
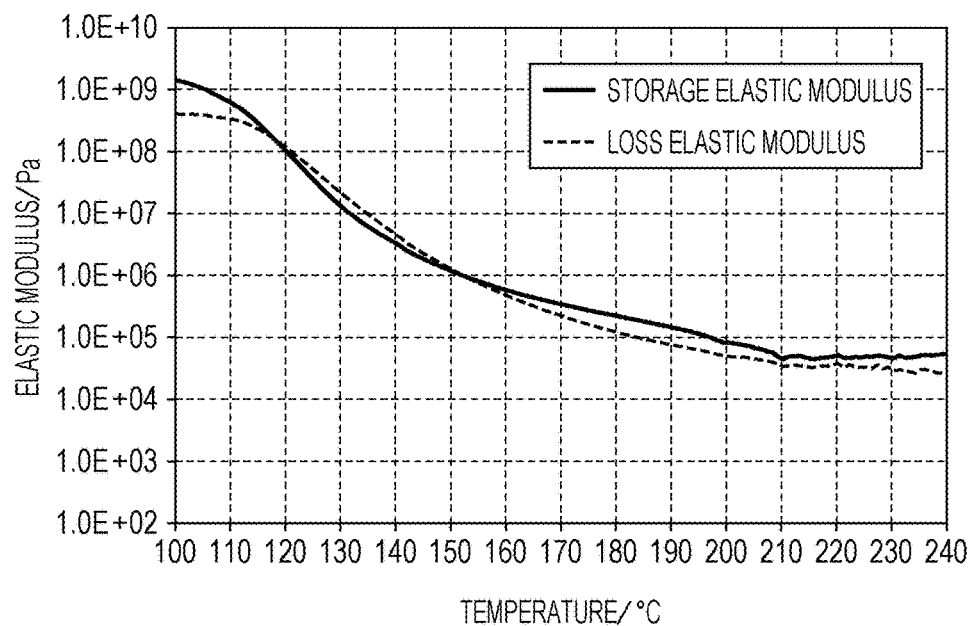
FIG. 15A is a graph of the storage elastic modulus and the loss elastic modulus of a powder of Comparative example 3.
Figure 15B:
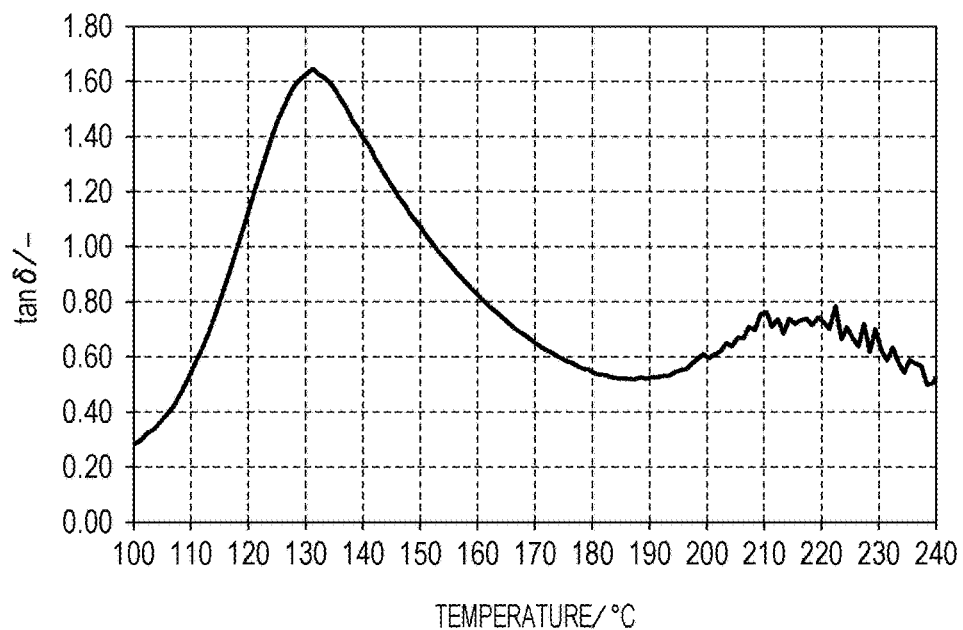
FIG. 15B is a graph of tan δ of the powder of Comparative example 3.
Figure 16A:
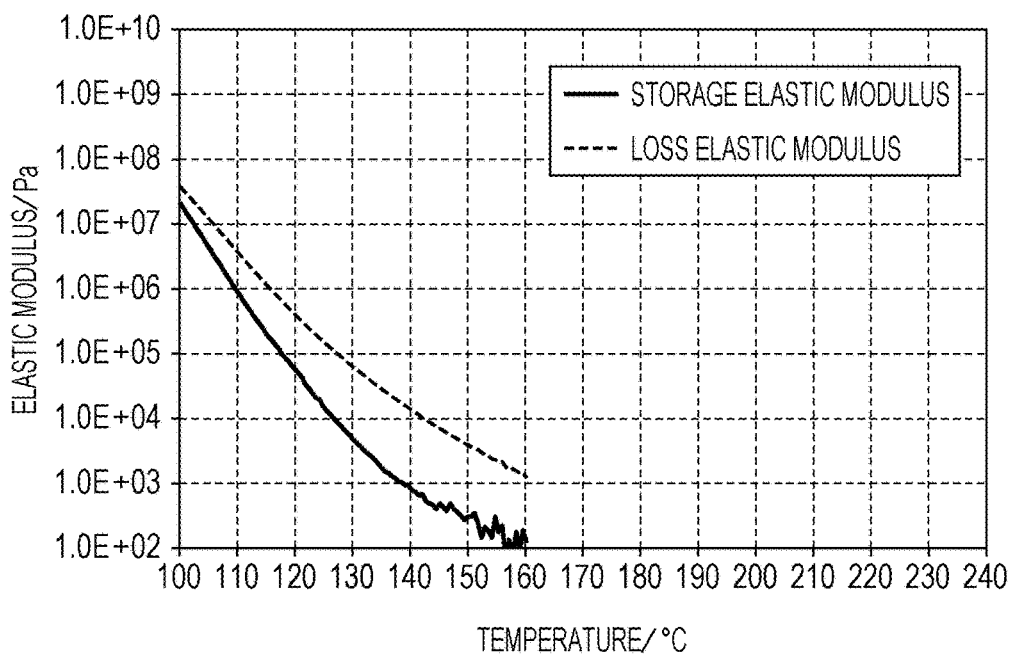
FIG. 16A is a graph of the storage elastic modulus and the loss elastic modulus of a powder of Comparative example 4.
Figure 16B:
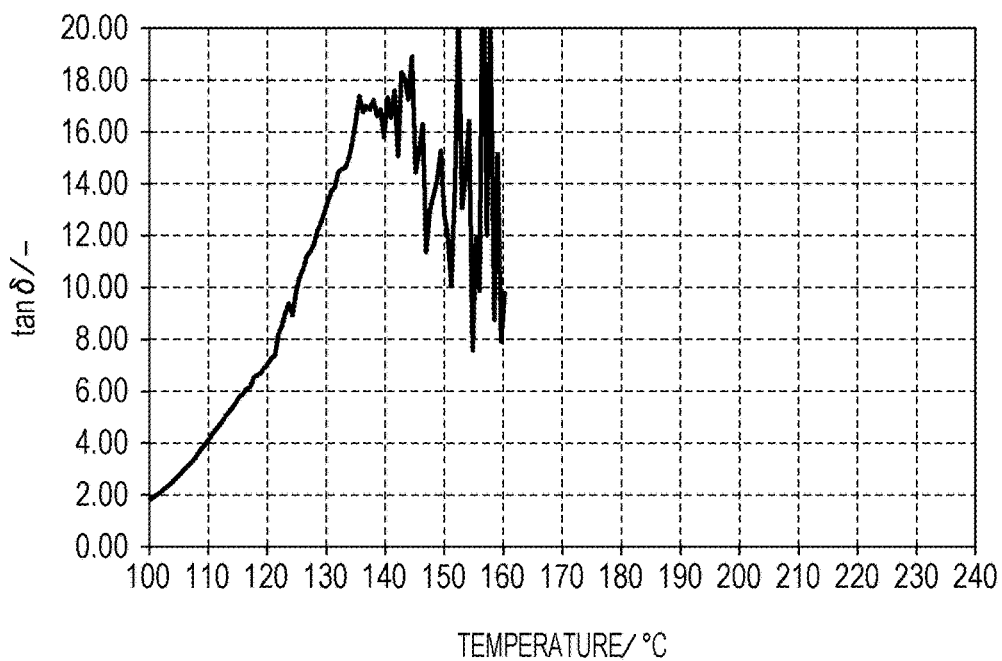
FIG. 16B is a graph of tan δ of the powder of Comparative example 4.
Figure 17A:
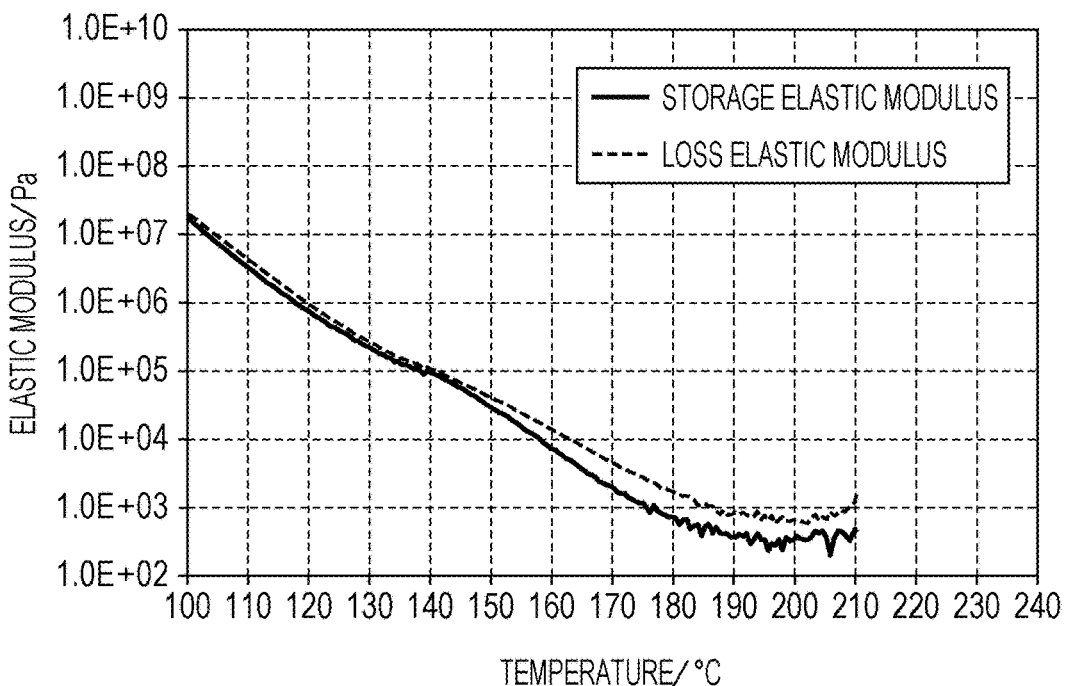
FIG. 17A is a graph of the storage elastic modulus and the loss elastic modulus of a powder of Comparative example 5.
Figure 17B:
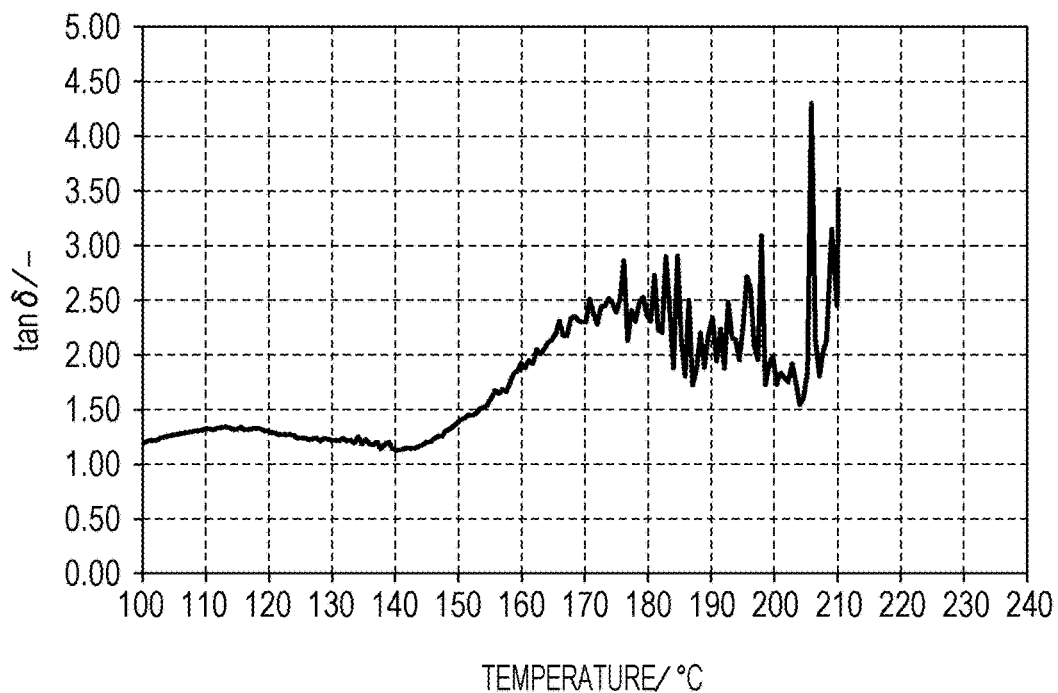
FIG. 17B is a graph of tan δ of the powder of Comparative example 5.

The water-soluble material 11 and the water-insoluble material 12 were dissolved or dispersed in 7.67 kg of water to prepare a dispersion. The dispersion was subjected to spray drying with a spray dryer to produce a powder. The resulting powder was classified to give powder 1 having an average particle size of 45 μm. FIG. 5 is an electron micrograph of powder 1.

The average particle size was measured with an LA-950 laser diffraction/scattering particle size distribution analyzer (HORIBA, Ltd.) as described below.

A batch cell containing a measurement solvent was placed on the LA-950 laser diffraction/scattering particle size distribution analyzer (HORIBA, Ltd.), and an optical axis and a background were adjusted. As the solvent, isopropyl alcohol (reagent grade, from Kishida Chemical Co., Ltd.) was used.

A powder to be measured was added to the batch cell until the transmittance of light emitted from a tungsten lamp reached 95% to 90%, and then the particle size distribution was measured. From the measurement results, the average particle size on a volume basis was calculated. The average particle sizes of other powders were measured in the same way as above.

The decomposition temperature was measured with a differential thermogravimetric analyzer (TG-DTA, Thermo Plus TG 8120, available from Rigaku Corporation), which is a thermogravimetric analyzer, as described below.

A powder to be measured was placed in a batch-type vacuum drying oven and heated at about 80° C. for 5 hours in vacuum to remove water adsorbed on the surfaces and inside thereof. After the drying was completed, the powder to be measured was placed in the TG-DTA, and then measurement was performed in an air atmosphere in the temperature range of 25° C. to 300° C. at a rate of temperature increase of 10° C./min, and a sampling rate of 1 second. The decomposition temperatures of other powders were measured in the same way as above.

Preparation of Powder 2

As the water-soluble material 11, 2.98 kg of maltotetraose (Nisshoku Fuji Oligo #450, available from Nihon Shokuhin Kako Co., Ltd.) and 1.28 kg of lactitol anhydride LC-0 (available from B Food Science Co., Ltd.) were used. As the water-insoluble material 12, 0.75 kg (solid content) of cellulose nanofibers (available from Daicel FineChem Ltd.) was used. The proportion by mass of the water-insoluble material 12 was 15% based on the total of the water-soluble material 11 and the water-insoluble material 12. As the cellulose nanofibers, 3.75 kg of a dispersion (Celish, water:cellulose nanofibers=80:20 (by weight), available from Daicel FineChem Ltd.) was used.

The water-soluble material 11 and the water-insoluble material 12 were dissolved or dispersed in 8.67 kg of water to prepare a dispersion. The dispersion was subjected to spray drying with a spray dryer to produce a powder. The resulting powder was classified to give powder 2 having an average particle size of 45 μm.

Preparation of Powder 3

As the water-soluble material 11, 3.60 kg of maltotetraose (Nisshoku Fuji Oligo #450, available from Nihon Shokuhin Kako Co., Ltd.) and 0.40 kg of erythritol anhydride (available from B Food Science Co., Ltd.) were used. As the water-insoluble material 12, 0.75 kg of (solid content) of cellulose nanofibers (available from Daicel FineChem Ltd.) was used. The proportion by mass of the water-insoluble material 12 was 15% based on the total of the water-soluble material 11 and the water-insoluble material 12. As the cellulose nanofibers, 3.75 kg of a dispersion (Celish, water:cellulose nanofibers=80:20 (by weight), available from Daicel FineChem Ltd.) was used.

The water-soluble material 11 and the water-insoluble material 12 were dissolved or dispersed in 11.0 kg of water to prepare a dispersion. The dispersion was subjected to spray drying with a spray dryer to produce a powder. The resulting powder was classified to give powder 3 having an average particle size of 45 μm.

Preparation of Powder 4

As the water-soluble material 11, 3.83 kg of maltotetraose (Nisshoku Fuji Oligo #450, available from Nihon Shokuhin Kako Co., Ltd.) and 0.43 kg of mannitol anhydride (available from B Food Science Co., Ltd.) were used. As the water-insoluble material 12, 0.75 kg of (solid content) of cellulose nanofibers (available from Daicel FineChem Ltd.) was used. The proportion by mass of the water-insoluble material 12 was 15% based on the total of the water-soluble material 11 and the water-insoluble material 12. As the cellulose nanofibers, 3.75 kg of a dispersion (Celish, water:cellulose nanofibers=80:20 (by weight), available from Daicel FineChem Ltd.) was used.

The water-soluble material 11 and the water-insoluble material 12 were dissolved or dispersed in 8.67 kg of water to prepare a dispersion. The dispersion was subjected to spray drying with a spray dryer to produce a powder. The resulting powder was classified to give powder 4 having an average particle size of 45 μm.

Preparation of Powder 5

As the water-soluble material 11, 2.80 kg of maltotetraose (Nisshoku Fuji Oligo #450, available from Nihon Shokuhin Kako Co., Ltd.) and 1.20 kg of lactitol anhydride LC-0 (available from B Food Science Co., Ltd.) were used. As the water-insoluble material 12, 1.72 kg of crystalline cellulose (Endurance MCC VE-050, available from FMC) was used. The proportion by mass of the water-insoluble material 12 was 30% based on the total of the water-soluble material 11 and the water-insoluble material 12.

The water-soluble material 11 and the water-insoluble material 12 were melt-mixed at 120° C. After cooling, the resulting solid mixture was pulverized to produce a powder. The resulting powder was classified to give power 5 having an average particle size of 46 μm.

Preparation of Powder 6

A shell composed of sucrose behenate was formed on the surface layer of each of the particles of the powder 2 by a method described below, thereby providing powder 6.

First, 10 g of sucrose behenate (RYOTO Sugar Ester B370f, from Mitsubishi-Kagaku Foods Corporation) was dispersed in 500 g of ethanol (reagent grade, from Kishida Chemical Co., Ltd.) to prepare a dispersion. The dispersion was heated to 80° C. with stirring to prepare a solution. Note that sucrose behenate is insoluble in water.

To the resulting solution, 100 g of powder 2 was added. The resulting mixture was stirred for 5 minutes while the temperature was maintained at 80° C. After the mixing was completed, the mixture was cooled to 60° C. over a period of 20 minutes. After the solution was cooled to normal temperature, the resulting mixture was filtered to provide a solid.

The resulting solid was dried while being disintegrated, thereby providing a powder. The resulting powder was classified to give a powder 6 having and average particle size of 50 μm. Observations of cross sections of particles in powder 6 reveal that each of the particles had a cross-sectional structure as illustrated in FIG. 1B and that the shell 13 having a thickness of about 400 nm was formed.

Preparation of Powder 7

As the water-soluble material 11, 4.25 kg of maltotetraose (Nisshoku Fuji Oligo #450, available from Nihon Shokuhin Kako Co., Ltd.) was used. As the water-insoluble material 12, 0.75 kg (solid content) of cellulose nanofibers (available from Daicel FineChem Ltd.) was used. The proportion by mass of the water-insoluble material 12 was 15% based on the total of the water-soluble material 11 and the water-insoluble material 12. As the cellulose nanofibers, 3.75 kg of a dispersion (Celish, water:cellulose nanofibers=80:20 (by weight), available from Daicel FineChem Ltd.) was used.

The water-soluble material 11 and the water-insoluble material 12 were dissolved or dispersed in 8.67 kg of water to prepare a dispersion. The dispersion was subjected to spray drying with a spray dryer to produce a powder. The resulting powder was classified to give powder 7 having an average particle size of 45 μm.

Preparation of Powder 8

As the water-soluble material 11, 50 parts by mass of maltotetraose (Nisshoku Fuji Oligo #450, available from Nihon Shokuhin Kako Co., Ltd.) and 30 parts by mass of lactitol anhydride LC-0 (available from B Food Science Co., Ltd.) were used.

The water-soluble material 11 was melt-mixed at 120° C. After cooling, the resulting solid mixture was pulverized to produce a powder. The resulting powder was classified to give powder 8 having an average particle size of 50 μm.

Preparation of Powder 9

As the water-soluble material 11, 3.15 kg of maltotetraose (Nisshoku Fuji Oligo #450, available from Nihon Shokuhin Kako Co., Ltd.) and 1.35 kg of lactitol anhydride LC-0 (available from B Food Science Co., Ltd.) were used. As the water-insoluble material 12, 0.50 kg (solid content) of cellulose nanofibers (available from Daicel FineChem Ltd.) was used. The proportion by mass of the water-insoluble material 12 was 10% based on the total of the water-soluble material 11 and the water-insoluble material 12. As the cellulose nanofibers, 2.50 kg of a dispersion (Celish, water:cellulose nanofibers=80:20 (by weight), available from Daicel FineChem Ltd.) was used.

The water-soluble material 11 and the water-insoluble material 12 were dissolved or dispersed in 9.67 kg of water to prepare a dispersion. The dispersion was subjected to spray drying with a spray dryer to produce a powder. The resulting powder was classified to give powder 9 having an average particle size of 45 μm.

Preparation of Powder 10

As the water-soluble material 11, 3.06 kg of maltotetraose (Nisshoku Fuji Oligo #450, available from Nihon Shokuhin Kako Co., Ltd.) and 1.31 kg of lactitol anhydride LC-0 (available from B Food Science Co., Ltd.) were used. As the water-insoluble material 12, 0.63 kg (solid content) of cellulose nanofibers (available from Daicel FineChem Ltd.) was used. The proportion by mass of the water-insoluble material 12 was 12.5% based on the total of the water-soluble material 11 and the water-insoluble material 12. As the cellulose nanofibers, 3.15 kg of a dispersion (Celish, water:cellulose nanofibers=80:20 (by weight), available from Daicel FineChem Ltd.) was used.

The water-soluble material 11 and the water-insoluble material 12 were dissolved or dispersed in 9.15 kg of water to prepare a dispersion. The dispersion was subjected to spray drying with a spray dryer to produce a powder. The resulting powder was classified to give powder 10 having an average particle size of 45 μm.

Preparation of Powder 11

As the water-soluble material 11, 2.80 kg of maltotetraose (Nisshoku Fuji Oligo #450, available from Nihon Shokuhin Kako Co., Ltd.) and 1.20 kg of lactitol anhydride LC-0 (available from B Food Science Co., Ltd.) were used. As the water-insoluble material 12, 0.44 kg of crystalline cellulose (Endurance MCC VE-050, available from FMC) was used. The proportion by mass of the water-insoluble material 12 was 10% based on the total of the water-soluble material 11 and the water-insoluble material 12.

The water-soluble material 11 and the water-insoluble material 12 were melt-mixed at 120° C. After cooling, the resulting solid mixture was pulverized to produce a powder. The resulting powder was classified to give powder 11 having an average particle size of 46 μm.

Preparation of Powder 12

As the water-soluble material 11, 2.80 kg of maltotetraose (Nisshoku Fuji Oligo #450, available from Nihon Shokuhin Kako Co., Ltd.) and 1.20 kg of lactitol anhydride LC-0 (available from B Food Science Co., Ltd.) were used. As the water-insoluble material 12, 1.0 kg of crystalline cellulose (Endurance MCC VE-050, available from FMC) was used. The proportion by mass of the water-insoluble material 12 was 20% based on the total of the water-soluble material 11 and the water-insoluble material 12.

The water-soluble material 11 and the water-insoluble material 12 were melt-mixed at 120° C. After cooling, the resulting solid mixture was pulverized to produce a powder. The resulting powder was classified to give powder 12 having an average particle size of 46 μm.

Evaluation of Powder

The resulting powders 1 to 12 were evaluated as described below. Table 1 lists the results.

TABLE 1

Table 1

| | | Example 1 | Example 2 | Example 3 | Example 4 | Example 5 | Example 6 | Example 7 | Comparative example 1 | Comparative example 2 | Comparative example 3 | Comparative example 4 | Comparative example 5 |
|---|---|---|---|---|---|---|---|---|---|---|---|---|---|
| Type of powder | | powder 1 | powder 2 | powder 3 | powder 4 | powder 5 | powder 6 | powder 7 | powder 8 | powder 9 | powder 10 | powder 11 | powder 12 |
| Water-soluble organic material | | maltotetraose lactitol | maltotetraose lactitol | maltotetraose erythritol | maltotetraose mannitol | maltotetraose lactitol | maltotetraose lactitol | maltotetraose — | maltotetraose lactitol | maltotetraose lactitol | maltotetraose lactitol | maltotetraose lactitol | maltotetraose lactitol |
| Water-insoluble organic material | Material | cellulose nanofiber | cellulose nanofiber | cellulose nanofiber | cellulose nanofiber | crystalline cellulose | cellulose nanofiber | cellulose nanofiber | — | cellulose nanofiber | cellulose nanofiber | crystalline cellulose | crystalline cellulose |
| | % by weight | 20% | 15% | 15% | 15% | 30% | 15% | 15% | — | 10% | 12.5% | 10% | 20% |
| Shell | | — | — | — | — | — | sucrose behenate | — | — | — | — | — | — |
| Powder production method | | spray dry | spray dry | spray dry | spray dry | mixing pulverization | spray dry | spray dry | mixing pulverization | spray dry | spray dry | mixing pulverization | mixing pulverization |
| Temperature T1 at which storage elastic modulus is 1 MPa (° C.) | | 197 | 160 | 170 | 169 | 160 | 157 | 195 | 122 | 146 | 152 | 110 | 117 |
| Decomposition temperature T2 (° C.) | | 217 | 217 | 226 | 232 | 219 | 218 | 225 | 220 | 217 | 217 | 219 | 219 |
| Storage elastic modulus > loss elastic modulus in temperature range of T1 to (T1 + 10) | | yes | yes | yes | yes | yes | yes | yes | no | no | no | no | no |
| Storage elastic modulus > loss elastic modulus in temperature range of T1 to T2 | | yes | yes | yes | yes | yes | yes | yes | no | no | no | no | no |
| Co-lamination property with ABS powder | | A | A | A | A | A | A | A | D | D | C | D | D |
| Co-lamination property with PP powder | | B | A | A | A | A | A | B | D | D | C | D | D |
| Moisture resistance | | A | A | A | A | A | A | A | C | A | A | C | C |
| Transferability during lamination | | A | A | A | A | A | A | A | C | A | A | C | C |
| Solubility in water | | A | A | A | A | A | A | A | A | A | A | A | A |

Measurement of Viscoelasticity

Methods of measuring viscoelasticity are roughly categorized into two methods: dynamic viscoelastic measurement and static viscoelastic measurement. The dynamic viscoelastic measurement is a method in which the dynamic properties of a sample are measured by measuring a stress or strain generated in the sample when a time-varying (oscillating) strain or stress is applied to the sample. The static viscoelastic measurement is a method in which a change in stress or strain is measured under a constant strain or constant stress, which remains unchanged with time.

When the storage elastic modulus and the loss elastic modulus of a sample are measured, usually, the dynamic viscoelastic measurement is performed. Specifically, a time-varying strain is applied to the sample, delay in response to the applied strain is measured to measure the storage elastic modulus and the loss elastic modulus.

In this example, the dynamic viscoelastic measurement was performed with a rotational rheometer. Dependence on temperature of the dynamic viscoelasticity of each powder in a shear direction was measured with an MCR 302 rheometer (available from Anton Paar). A parallel plate (PP10, available from Anton Paar) was used, and the measurement was performed by sandwiching a compact formed of each of the powder between a heating plate and the parallel plate. The compact was formed by molding each powder with a press-forming machine. At this time, a pressure of 2 MPa was applied at normal temperature for 1 minute to form a cylindrical compact having a diameter of 10 mm and a height of 1 mm.

The dependence of the dynamic viscoelasticity on temperature was measured with the rotational rheometer. The measurement was performed in an automatic measurement mode at an angular frequency of 1 Hz (6.28 radian/s) and an initial strain of 0.1%. The measurement was performed while the height of the parallel plate was appropriately changed in such a manner that the parallel plate does not apply a load to the compact. The temperature range during the measurement was 100° C. or higher and 240° C. or lower. The measurement was performed at a rate of temperature increase of 2° C./min. The viscoelasticity data was measured every 0.5° C. to 1° C. Each of the powders was measured, and the storage elastic modulus G' and the loss elastic modulus G" were plotted against temperature to form a graph. From the results, loss tan δ, which is the ratio of the loss elastic modulus to the storage elastic modulus (G"/G'), was plotted against temperature to form a graph.

FIGS. 6A to 17B are graphs depicting the storage elastic moduli and the loss elastic moduli and graphs depicting tan δ of powders 1 to 12. In each of the graphs depicting the storage elastic moduli and the loss elastic moduli, the solid line represents the storage elastic modulus, and the broken line represents the loss elastic modulus. When tan δ is lower than 1, the storage elastic modulus is higher than the loss elastic modulus at the temperature.

On the basis of the resulting data obtained from the viscoelasticity measurement, letting a temperature at which the storage elastic modulus of each powder is 1 MPa be T1, the storage elastic modulus was compared with the loss elastic modulus in the temperature range of T1° C. to (T1+10)° C. Table 1 summarizes the evaluation results as to whether the storage elastic modulus is always higher than the loss elastic modulus or not in the temperature range.

The viscoelasticity measurement results indicated the following: in each of powders 1 to 7, the storage elastic modulus was always higher than the loss elastic modulus in the temperature range of T1° C. to (T1+10)° C. The storage elastic modulus was always higher than the loss elastic modulus in the temperature range of T1° C. to a temperature lower than the decomposition temperature of each powder. In each of powders 8 to 12, in the temperature range of T1° C. to (T1+10)° C., there was a temperature at which the storage elastic modulus was lower than the loss elastic modulus.

These results demonstrated that powders 8 to 12 exhibited sol-like behavior at a temperature in the temperature range and that powders 1 to 7 always exhibited rubber-like behavior in the temperature range.

Evaluation of Co-Lamination Property with ABS Powder

The co-lamination properties of the powders 1 to 12 with other constituent material powders were evaluated.

Objects were produced by the electrophotographic method using powders 1 to 12 together with a powder formed by pulverizing ABS (ABS130, available from Techno Polymer Co., Ltd). In this case, an apparatus illustrated in FIG. 2 was used. A particle layer having a pattern formed of two types of constituent material powders was formed. The particle layer was repeatedly laminated. When the lamination was performed, the particle layer was heated to fuse the particles to perform lamination. When the particle layer was heated, the particle layer was heated to 160° C. to 180° C. Thereby, the objects were produced, each of the objects including both of a portion formed of the ABS powder and a portion formed of a corresponding one of powders 1 to 12. By comparing the shape of each of the objects with the shape of a target object, the co-lamination properties of powders 1 to 12 with the ABS powder were evaluated.

With regard to the comparison with the shape of the target object, the dimensions (height in the lamination direction and dimensions in a direction parallel to the particle layers) of the resulting objects were measured, and the error was calculated with respect to each of the dimensions of the target object to make the evaluation. The height in the lamination direction was measured with a dial gauge (available from Mitutoyo Corporation), and the dimensions in the direction parallel to the particle layers were measured with a vernier caliper (available from Mitutoyo Corporation). Furthermore, the shape was visually checked.

Rank A: The error of each of the dimensions of the resulting object was less than 10% with respect to a corresponding one of the dimensions of the target object.

Rank B: In the object, the thermoplastic particles in the powder are not sufficiently fused.

Rank C: Although the error of each of the dimensions of the resulting object was less than 10% with respect to a corresponding one of the dimensions of the target object, the powder was stringy during lamination.

Rank D: The error of each of the dimensions of the resulting object was 10% or more with respect to a corresponding one of the dimensions of the target object.

Evaluation of Co-Lamination Property with Polypropylene Powder

A polypropylene powder formed by pulverizing polypropylene (Noblen W-531, available from Sumitomo Chemical Co., Ltd.) was used in place of the ABS powder. The co-lamination properties of powders 1 to 12 with the polypropylene powder (PP powder) were evaluated in the same way as the ABS powder. When the particles were heated in a heat-fusion step, the particle layers were heated to 140° C. to 160° C.

The evaluation results of the co-lamination properties of each of powders 1 to 12 with the ABS powder indicated that when each of powders 1 to 7 was co-laminated with the ABS powder, the dimensions of the resulting object were close to the dimensions of the target object. That is, each of the powders 1 to 12 was able to be co-laminated with the ABS powder. When each of powders 8, 9, 11, and 12 was co-laminated with the ABS powder, a portion formed of each of powders 8, 9, 11, and 12 flowed and deformed markedly. When powder 10 was co-laminated with the ABS powder, the dimensions of the resulting object were close to the dimensions of the target object; however, powder 10 exhibited tackiness when heated during lamination. As a result, strings were formed between the object and the transfer belt to cause irregularities on a surface of the object.

Figure 18A:
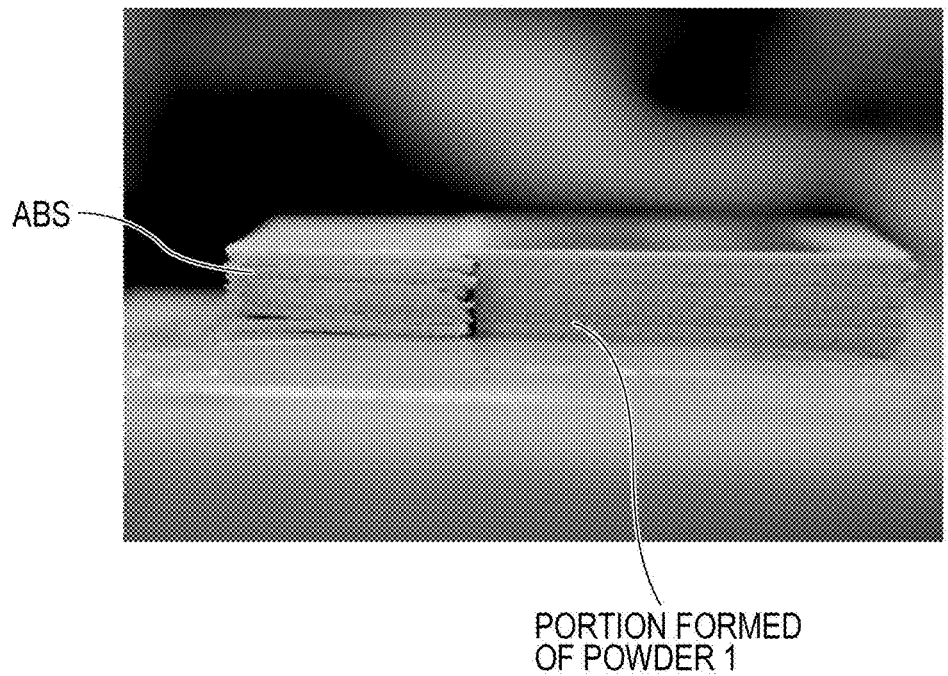
FIG. 18A is a photograph of an object formed by co-lamination of the powder of Example 1 with an ABS powder.
Figure 18B:
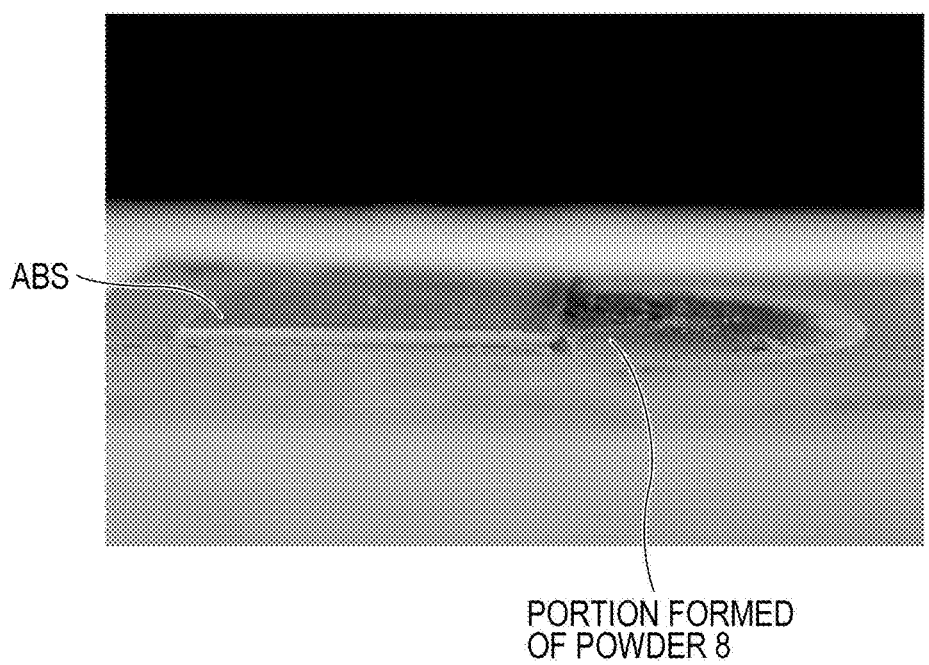
FIG. 18B is a photograph of an object formed by the co-lamination of the powder of Comparative example 1 with the ABS powder.

As examples, FIG. 18A illustrates a photograph of an object formed by the co-lamination of powder 1 with the ABS powder, and FIG. 18B illustrates a photograph of an object formed by the co-lamination of powder 8 with the ABS powder.

As illustrated in FIG. 18B, when powder 8 was used, the portion formed of powder 8 flowed by heat during lamination, thereby resulting in a collapsed shape broader than the target shape. In contrast, as illustrated in FIG. 18B, when powder 1 was used, the portion formed of powder 1 did not flow even by heat during lamination, so that an object having the target shape was formed.

The evaluation results of the co-lamination properties of each of powders 1 to 12 with the PP powder indicated that when each of powders 2 to 6 was co-laminated with the ABS powder, the dimensions of the resulting object were close to the dimensions of the target object. That is, each of the powders 2 to 6 was able to be co-laminated with the PP powder. When each of powders 1 and 7 was co-laminated with the PP powder, the dimensions of the resulting object were close to the dimensions of the target object; however, the thermoplastic particles contained in powders 1 and 7 were not sufficiently fused in the objects. The evaluation results of the co-lamination properties of each of powders 8 to 12 with the PP powder were substantially the same as the evaluation results of the co-lamination properties of each of powders 8 to 12 with the ABS powder.

In any evaluation test, when the resulting objects were immersed in deionized water, the portions (support portions) formed of powders 1 to 12 were able to be easily removed.

As described above, it was found that powders 1 to 7 can be heated and fused in combination with the ABS powder to form layers and can be removed with water after lamination. Thus, powders 1 to 7 are suitably used as support material powders when the ABS powder is used as a structural material powder. It was found that powders 2 to 6 can be heated and fused in combination with the PP powder to form layers and can be removed with water after lamination. Thus, powders 2 to 6 are suitably used as support material powders when the PP powder is used as a structural material powder.

Evaluation of Moisture Resistance

In a 100 mL polymer cup, 1.0 g of each of the powders prepared was placed. The polymer cup containing each powder was hermetically sealed in a bag. The bag was allowed to stand in a high-humidity environment at 30° C. and a humidity of 80%. After 15 minutes, the bag was opened to expose the constituent material powder in the polymer cup to the high-humidity environment. The powder was allowed to stand for 30 minutes, and then the polymer cup was removed from the high-humidity environment.

The evaluation of moisture resistance was performed as follows: The polymer cups were tilted, and the flowability of powders 1 to 12 was evaluated according to criteria described below. The evaluation criteria are described below.

Rank A: The powder has flowability.
Rank B: The thermoplastic particles are fused together and do not have flowability.

Evaluation of Transferability During Lamination

Three-dimensional objects were produced from powders 1 to 12 with the apparatus, illustrated in FIG. 2, for forming a three-dimensional object by an electrophotographic method. After particle layers of powders 1 to 12 were transferred from the intermediate supporting and conveying belt 24 (transfer belt) to the intermediate items in process, the state of the transfer belt was checked. The transferability of each of the powders during lamination was evaluated according to criteria below. The evaluation criteria are as follows:

Rank A: The particle layer left on the transfer belt is 10% or less (by area) of the particle layer before transfer.
Rank B: The particle layer left on the transfer belt is more than 10% (by area) of the particle layer before transfer.

Evaluation of Solubility in Water

In a mold having a diameter of 14 mm, 0.5 g of each of powder 1 to 12 prepared was placed. The mold was hermetically sealed in such a manner that heat was conducted from the top, the bottom, and the periphery. Subsequently, each of the powders was appropriately heated to a temperature equal to or higher than the softening temperature and equal to or lower than the decomposition temperature of the corresponding powder, and cooled to form a pellet having a diameter of 14 mm.

The resulting pellet was placed in 50 g of water with a temperature of 20° C. and allowed to stand for 12 hours under stirring with a magnetic stirrer. Then an undissolved solid portion of the pellet was removed. The volume of the undissolved solid portion was measured. The percentage by volume (the rate of change in volume) was calculated with respect to the volume of the pellet before the immersion in water. The solubility of powders 1 to 12 in water was evaluated according to the following criteria. The evaluation criteria are as follows:

Rank A: The rate of change in volume is 50% or more.
Rank B: The rate of change in volume is less than 50% or more.

According to an embodiment of the present invention, the support portion can be removed by bringing the support portion into contact with the water-containing liquid after lamination, and the temperature control in the additive manufacturing process can be easily performed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:
1. A thermoplastic composition comprising:
a water-soluble material and cellulose nanofibers,
wherein the water-soluble material comprises a poly (alkylene oxide) or a poly(vinyl alcohol),
wherein the content of the water-soluble material is 50% by mass or more and 95% by mass or less when the total mass of the thermoplastic composition is 100% by mass, and
wherein the thermoplastic composition is a constituent material used in an additive manufacturing process.

2. The thermoplastic composition according to claim 1, wherein the cellulose nanofibers are contained in an amount of 15% or more by mass and less than 50% by mass per 100% of the total mass of the thermoplastic composition.

3. The thermoplastic composition according to claim 1, wherein a storage elastic modulus of the thermoplastic composition is greater than a loss elastic modulus of the thermoplastic composition in a temperature range of T° C. or higher and (T+10°) C. or lower, T being a temperature at which the storage elastic modulus of the thermoplastic composition is 1 MPa, and
  wherein the storage elastic modulus and the loss elastic modulus of the thermoplastic composition are obtained by:
  pressure forming the thermoplastic composition into a cylindrical compact having a diameter of 10 mm and a thickness of 1 mm, and
  measuring temperature dependency of a storage elastic modulus and a loss elastic modulus of the cylindrical compact in a shear direction using a rotational rheometer at an angular frequency of 1 Hz while raising the temperature at a rate of 2° C./minute.

4. The thermoplastic composition according to claim 1, wherein the thermoplastic composition contains a first water-soluble material and a second water-soluble material.

\* \* \* \* \*